United States Patent
Sheth et al.

(10) Patent No.: US 9,525,998 B2
(45) Date of Patent: Dec. 20, 2016

(54) WIRELESS DISPLAY WITH MULTISCREEN SERVICE

(75) Inventors: Soham V. Sheth, San Diego, CA (US); Vijayalakshmi R. Raveendran, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 13/606,839

(22) Filed: Sep. 7, 2012

(65) Prior Publication Data

US 2013/0238702 A1    Sep. 12, 2013

Related U.S. Application Data

(60) Provisional application No. 61/583,987, filed on Jan. 6, 2012, provisional application No. 61/599,564, filed on Feb. 16, 2012.

(51) Int. Cl.
*G06F 15/16* (2006.01)
*H04W 8/24* (2009.01)
(Continued)

(52) U.S. Cl.
CPC .............. *H04W 8/24* (2013.01); *G06F 3/1423* (2013.01); *G06F 3/1454* (2013.01); *H04L 67/38* (2013.01);
(Continued)

(58) Field of Classification Search
CPC .............. H04L 29/04; H04L 29/08072; H04L 29/06027; H04L 12/581; H04L 65/608; G06Q 10/10; H04N 21/4126; G06F 2203/0383
(Continued)

(56) References Cited

U.S. PATENT DOCUMENTS 4,791,554 A    12/1988 Hirota et al.
5,828,370 A    10/1998 Moeller et al.
(Continued)

FOREIGN PATENT DOCUMENTS

CN    1437355 A    8/2003
CN    1561609 A    1/2005
(Continued)

OTHER PUBLICATIONS

"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
(Continued)

*Primary Examiner* — Kevin Bates
*Assistant Examiner* — Clarence McCray
(74) *Attorney, Agent, or Firm* — Steven R. Thiel

(57) ABSTRACT

Techniques of this disclosure are generally directed to a method of transmitting content of a first wireless computing device to a second wireless computing device. A first wireless computing device may initiate a WI-FI display (WFD) connection, transmit data from the first wireless computing device via the WFD connection to the second wireless computing device, execute a media sharing application that enables the first wireless computing device to share a media item of a playlist with a wireless client computing device, transmit information that describes the media item of the playlist to the wireless client computing device, wherein transmitting the information that describes the media item causes the second wireless computing device to determine if the wireless client computing device is capable of outputting the media item, and transmit the media item to the wireless client computing device.

30 Claims, 11 Drawing Sheets

(51) Int. Cl.
*G06F 3/14* (2006.01)
*H04L 29/06* (2006.01)

(52) U.S. Cl.
CPC ........... *H04L 69/24* (2013.01); *G09G 2340/02* (2013.01); *G09G 2350/00* (2013.01); *G09G 2370/04* (2013.01); *G09G 2370/10* (2013.01); *G09G 2370/16* (2013.01)

(58) Field of Classification Search
USPC .................... 709/204, 205, 206, 219, 208
See application file for complete search history.

(56) References Cited

U.S. PATENT DOCUMENTS

| | | | |
|---|---|---|---|
| 5,835,723 A | 11/1998 | Andrews et al. | |
| 5,925,137 A | 7/1999 | Okanoue et al. | |
| 6,014,706 A | 1/2000 | Cannon et al. | |
| 6,049,549 A | 4/2000 | Ganz et al. | |
| 6,195,680 B1 | 2/2001 | Goldszmidt et al. | |
| 6,252,889 B1 | 6/2001 | Patki et al. | |
| 6,266,690 B1 | 7/2001 | Shankarappa et al. | |
| 6,400,720 B1 | 6/2002 | Ovadia et al. | |
| 6,424,626 B1 | 7/2002 | Kidambi et al. | |
| 6,515,992 B1 | 2/2003 | Weston et al. | |
| 6,571,279 B1* | 5/2003 | Herz et al. | 709/217 |
| 6,594,699 B1* | 7/2003 | Sahai et al. | 709/228 |
| 6,608,841 B1 | 8/2003 | Koodli | |
| 6,748,195 B1 | 6/2004 | Phillips | |
| 6,760,772 B2 | 7/2004 | Zou et al. | |
| 6,801,530 B1 | 10/2004 | Brandt et al. | |
| 6,876,857 B1 | 4/2005 | Nee et al. | |
| 6,917,976 B1 | 7/2005 | Slaughter et al. | |
| 6,963,921 B1 | 11/2005 | Yang et al. | |
| 7,035,281 B1 | 4/2006 | Spearman et al. | |
| 7,072,984 B1* | 7/2006 | Polonsky et al. | 709/246 |
| 7,080,151 B1 | 7/2006 | Borella et al. | |
| 7,085,420 B2 | 8/2006 | Mehrotra | |
| 7,099,629 B1 | 8/2006 | Bender | |
| 7,324,462 B1 | 1/2008 | Page et al. | |
| 7,328,021 B1 | 2/2008 | Satapathy | |
| 7,333,464 B2 | 2/2008 | Yang et al. | |
| 7,366,204 B2 | 4/2008 | Kang et al. | |
| 7,373,415 B1* | 5/2008 | DeShan et al. | 709/231 |
| 7,376,155 B2 | 5/2008 | Ahn et al. | |
| 7,477,659 B1 | 1/2009 | Nee et al. | |
| 7,519,470 B2 | 4/2009 | Brasche et al. | |
| 7,529,823 B2 | 5/2009 | Trufinescu et al. | |
| 7,565,357 B2 | 7/2009 | Rao | |
| 7,688,859 B2 | 3/2010 | Chen et al. | |
| 7,696,980 B1 | 4/2010 | Piot et al. | |
| 7,712,670 B2 | 5/2010 | Sauerwein, Jr. et al. | |
| 7,716,385 B2 | 5/2010 | Saint-Hilaire et al. | |
| 7,719,972 B2 | 5/2010 | Yuan et al. | |
| 7,720,096 B2 | 5/2010 | Klemets | |
| 7,768,536 B2* | 8/2010 | Hyatt | 345/660 |
| 7,835,406 B2 | 11/2010 | Oran et al. | |
| 7,836,051 B1* | 11/2010 | Mason | 707/734 |
| 7,868,890 B2 | 1/2011 | Ludwin et al. | |
| 7,881,315 B2 | 2/2011 | Haveson et al. | |
| 7,929,475 B2 | 4/2011 | Simonson et al. | |
| 8,001,384 B2 | 8/2011 | Yamamoto et al. | |
| 8,069,169 B2* | 11/2011 | Fitzpatrick et al. | 707/732 |
| 8,102,849 B2 | 1/2012 | Martinez Bauza et al. | |
| 8,157,168 B2 | 4/2012 | Sauerwein, Jr. et al. | |
| 8,364,201 B1 | 1/2013 | Fujisaki | |
| 8,406,961 B2 | 3/2013 | Pathak et al. | |
| 8,428,048 B2 | 4/2013 | Walker et al. | |
| 8,437,347 B2 | 5/2013 | Casaccia et al. | |
| 8,466,870 B2 | 6/2013 | Cohen et al. | |
| 8,517,251 B2 | 8/2013 | Cohen et al. | |
| 8,572,000 B1* | 10/2013 | Weingarten et al. | 705/321 |
| 8,593,996 B2 | 11/2013 | Lee et al. | |
| 8,605,048 B2 | 12/2013 | Ye et al. | |
| 8,605,584 B2 | 12/2013 | Leung et al. | |
| 8,612,619 B2 | 12/2013 | Guo et al. | |
| 8,724,696 B2 | 5/2014 | Byford et al. | |
| 8,751,582 B1* | 6/2014 | Behforooz et al. | 709/206 |
| 8,966,131 B2 | 2/2015 | Huang et al. | |
| 2002/0007494 A1 | 1/2002 | Hodge | |
| 2002/0035621 A1 | 3/2002 | Zintel et al. | |
| 2002/0097718 A1 | 7/2002 | Korus et al. | |
| 2003/0031152 A1 | 2/2003 | Gohda et al. | |
| 2003/0064752 A1 | 4/2003 | Adachi et al. | |
| 2003/0110297 A1* | 6/2003 | Tabatabai et al. | 709/246 |
| 2003/0142631 A1 | 7/2003 | Silvester | |
| 2003/0152098 A1 | 8/2003 | Zhu | |
| 2003/0167171 A1 | 9/2003 | Calderone et al. | |
| 2003/0225737 A1 | 12/2003 | Mathews | |
| 2004/0039934 A1 | 2/2004 | Land et al. | |
| 2004/0071169 A1 | 4/2004 | Abe et al. | |
| 2004/0083284 A1 | 4/2004 | Ofek et al. | |
| 2004/0103282 A1 | 5/2004 | Meier et al. | |
| 2004/0147264 A1 | 7/2004 | Ogawa | |
| 2004/0160967 A1 | 8/2004 | Fujita et al. | |
| 2004/0202249 A1 | 10/2004 | Lo et al. | |
| 2004/0214571 A1 | 10/2004 | Hong | |
| 2005/0018829 A1* | 1/2005 | Baker | 379/207.02 |
| 2005/0021810 A1 | 1/2005 | Umemura et al. | |
| 2005/0044142 A1 | 2/2005 | Garrec et al. | |
| 2005/0058090 A1 | 3/2005 | Chang et al. | |
| 2005/0060750 A1 | 3/2005 | Oka et al. | |
| 2005/0085239 A1 | 4/2005 | Cedervall | |
| 2005/0096086 A1 | 5/2005 | Singamsetty | |
| 2005/0102699 A1 | 5/2005 | Kim et al. | |
| 2005/0111361 A1 | 5/2005 | Hosein | |
| 2005/0130611 A1 | 6/2005 | Lu et al. | |
| 2005/0136990 A1 | 6/2005 | Hardacker et al. | |
| 2005/0138193 A1 | 6/2005 | Encarnacion et al. | |
| 2005/0144225 A1 | 6/2005 | Anderson et al. | |
| 2005/0149976 A1 | 7/2005 | Lupoi et al. | |
| 2005/0152330 A1 | 7/2005 | Stephens et al. | |
| 2005/0166241 A1 | 7/2005 | Kim et al. | |
| 2005/0175321 A1 | 8/2005 | Aridome et al. | |
| 2005/0176429 A1 | 8/2005 | Lee et al. | |
| 2005/0198663 A1 | 9/2005 | Chaney et al. | |
| 2005/0219266 A1 | 10/2005 | Koutani et al. | |
| 2005/0266798 A1 | 12/2005 | Moloney et al. | |
| 2005/0267946 A1 | 12/2005 | An et al. | |
| 2005/0271072 A1 | 12/2005 | Anderson et al. | |
| 2006/0002320 A1 | 1/2006 | Costa-Requena et al. | |
| 2006/0002395 A1 | 1/2006 | Araki et al. | |
| 2006/0013182 A1 | 1/2006 | Balasubramanian et al. | |
| 2006/0028398 A1 | 2/2006 | Willmore | |
| 2006/0050640 A1 | 3/2006 | Jin et al. | |
| 2006/0053459 A1 | 3/2006 | Simerly et al. | |
| 2006/0058003 A1 | 3/2006 | Lee | |
| 2006/0069797 A1 | 3/2006 | Abdo et al. | |
| 2006/0098593 A1 | 5/2006 | Edvardsen et al. | |
| 2006/0101146 A1 | 5/2006 | Wang | |
| 2006/0103508 A1 | 5/2006 | Sato | |
| 2006/0133414 A1 | 6/2006 | Luoma et al. | |
| 2006/0136963 A1 | 6/2006 | Oh et al. | |
| 2006/0146009 A1 | 7/2006 | Syrbe et al. | |
| 2006/0187964 A1 | 8/2006 | Li et al. | |
| 2006/0198448 A1 | 9/2006 | Aissi et al. | |
| 2006/0199537 A1 | 9/2006 | Eisenbach | |
| 2006/0202809 A1 | 9/2006 | Lane et al. | |
| 2006/0203805 A1 | 9/2006 | Karacali-Akyamac et al. | |
| 2006/0206340 A1 | 9/2006 | Silvera et al. | |
| 2006/0209787 A1 | 9/2006 | Okuda | |
| 2006/0218298 A1 | 9/2006 | Knapp et al. | |
| 2006/0222246 A1 | 10/2006 | Murai et al. | |
| 2006/0223442 A1 | 10/2006 | Stephens | |
| 2006/0233191 A1 | 10/2006 | Pirzada et al. | |
| 2006/0236250 A1* | 10/2006 | Gargi | 715/753 |
| 2006/0256851 A1 | 11/2006 | Wang et al. | |
| 2006/0268869 A1 | 11/2006 | Boers et al. | |
| 2006/0270417 A1 | 11/2006 | Chi | |
| 2006/0288008 A1 | 12/2006 | Bhattiprolu et al. | |
| 2007/0004387 A1 | 1/2007 | Gadamsetty et al. | |
| 2007/0008922 A1 | 1/2007 | Abhishek et al. | |
| 2007/0011039 A1* | 1/2007 | Oddo | 705/10 |
| 2007/0016654 A1 | 1/2007 | Bowles et al. | |

(56) References Cited

U.S. PATENT DOCUMENTS

| | | |
|---|---|---|
| 2007/0022195 A1 | 1/2007 | Kawano et al. |
| 2007/0037600 A1 | 2/2007 | Fukuda |
| 2007/0043550 A1 | 2/2007 | Tzruya |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0157283 A1 | 7/2007 | Setlur et al. |
| 2007/0162945 A1 | 7/2007 | Mills |
| 2007/0171910 A1 | 7/2007 | Kumar et al. |
| 2007/0182728 A1 | 8/2007 | Fujimori |
| 2007/0185744 A1* | 8/2007 | Robertson .................... 705/5 |
| 2007/0211041 A1 | 9/2007 | Lai et al. |
| 2007/0222779 A1* | 9/2007 | Fastert ................ G06T 1/00 345/418 |
| 2007/0259662 A1 | 11/2007 | Lee et al. |
| 2007/0264988 A1 | 11/2007 | Wilson et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |
| 2007/0299778 A1* | 12/2007 | Haveson ............ H04L 63/107 705/51 |
| 2008/0005348 A1 | 1/2008 | Kosiba et al. |
| 2008/0013658 A1 | 1/2008 | Lewis et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0050715 A1* | 2/2008 | Golczewski et al. ........ 434/350 |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1* | 6/2008 | Khedouri et al. ........... 709/217 |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0049093 A1* | 2/2009 | Wassingbo et al. ....... 707/104.1 |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1* | 4/2009 | Venkitaraman ... H04L 29/12311 709/203 |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1* | 12/2009 | Cho ................ H04W 88/02 370/277 |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1* | 12/2010 | Athas ................ H04L 67/02 709/219 |
| 2011/0002255 A1 | 1/2011 | Dharmaraju et al. |
| 2011/0016121 A1* | 1/2011 | Sambrani et al. ............ 707/734 |
| 2011/0019620 A1 | 1/2011 | Wang |
| 2011/0037447 A1 | 2/2011 | Mair |
| 2011/0051602 A1 | 3/2011 | Matthews et al. |
| 2011/0055017 A1* | 3/2011 | Solomon et al. .......... 705/14.66 |
| 2011/0066497 A1* | 3/2011 | Gopinath et al. .......... 705/14.53 |
| 2011/0066507 A1* | 3/2011 | Iyer et al. .................. 705/14.66 |
| 2011/0069720 A1 | 3/2011 | Jacobs et al. |
| 2011/0072473 A1 | 3/2011 | Funabiki et al. |
| 2011/0107388 A1* | 5/2011 | Lee et al. ...................... 725/118 |
| 2011/0115818 A1* | 5/2011 | Chung et al. ................. 345/635 |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1* | 7/2011 | Lemay .......................... 345/651 |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1* | 3/2012 | Sherwood et al. ........... 715/748 |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0209839 A1* | 8/2012 | Andrews et al. ............ 707/728 |
| 2012/0233238 A1* | 9/2012 | Braginsky et al. .......... 709/203 |
| 2012/0249575 A1* | 10/2012 | Krolczyk et al. ............ 345/619 |
| 2012/0323933 A1* | 12/2012 | He et al. ...................... 707/749 |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1* | 1/2013 | Raveendran et al. ........ 370/310 |
| 2013/0003624 A1* | 1/2013 | Huang .................. H04L 65/608 370/310 |
| 2013/0009873 A1 | 1/2013 | Huang et al. |
| 2013/0009887 A1* | 1/2013 | Huang ................ H04L 65/4092 345/173 |

(56) References Cited

U.S. PATENT DOCUMENTS

| | | | |
|---|---|---|---|
| 2013/0009996 A1* | 1/2013 | Raveendran | G06F 3/1454 345/660 |
| 2013/0013318 A1* | 1/2013 | Huang | G06F 3/1454 704/275 |
| 2013/0033435 A1 | 2/2013 | Raveendran et al. | |
| 2013/0033496 A1* | 2/2013 | Raveendran | G06F 3/1407 345/428 |
| 2013/0047189 A1* | 2/2013 | Raveendran et al. | 725/81 |
| 2013/0124740 A1* | 5/2013 | Liansky | G06F 15/16 709/228 |
| 2013/0128948 A1* | 5/2013 | Rabii et al. | 375/240.01 |
| 2013/0139210 A1* | 5/2013 | Huang | H04W 4/06 725/109 |
| 2013/0165238 A1* | 6/2013 | Batista Jerez | 463/42 |
| 2013/0174208 A1* | 7/2013 | Lee et al. | 725/109 |
| 2013/0188632 A1* | 7/2013 | Sheth et al. | 370/350 |
| 2013/0195119 A1* | 8/2013 | Huang | H04L 65/4092 370/468 |
| 2013/0215142 A1* | 8/2013 | Park | 345/619 |
| 2013/0218973 A1* | 8/2013 | Good et al. | 709/204 |
| 2013/0222301 A1 | 8/2013 | Lee et al. | |
| 2013/0227152 A1* | 8/2013 | Lee | H04W 48/16 709/227 |
| 2013/0234913 A1* | 9/2013 | Thangadorai | G06F 3/1423 345/2.1 |
| 2013/0246565 A1 | 9/2013 | Froelicher et al. | |
| 2013/0246665 A1 | 9/2013 | Lee et al. | |
| 2013/0272628 A1 | 10/2013 | Lee | |
| 2013/0297936 A1* | 11/2013 | Khosravi et al. | 713/168 |
| 2013/0304794 A1* | 11/2013 | Verma | G06F 3/038 709/201 |
| 2014/0019653 A1 | 1/2014 | Amchislavsky et al. | |
| 2014/0022146 A1* | 1/2014 | Thangadorai | H04N 21/4122 345/2.3 |
| 2014/0075351 A1* | 3/2014 | Hansen et al. | 715/765 |
| 2014/0089132 A1* | 3/2014 | Pavlidis et al. | 705/26.7 |
| 2014/0096164 A1* | 4/2014 | Bei et al. | 725/81 |
| 2014/0108333 A1* | 4/2014 | Jain et al. | 707/609 |
| 2014/0120829 A1 | 5/2014 | Bhamidipati et al. | |
| 2014/0173399 A1* | 6/2014 | Sorg et al. | 715/206 |
| 2014/0210693 A1 | 7/2014 | Bhamidipati et al. | |
| 2014/0250043 A1* | 9/2014 | Malinsky et al. | 706/46 |
| 2014/0372620 A1* | 12/2014 | Vedula | H04W 76/02 709/228 |
| 2015/0019328 A1* | 1/2015 | Abhyanker | 705/14.45 |
| 2015/0262245 A1* | 9/2015 | Arvanitis | 709/201 |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| CN | 101370038 A | 2/2009 |
| CN | 201210689 Y | 3/2009 |
| CN | 101771484 A | 7/2010 |
| CN | 101883147 A | 11/2010 |
| CN | 102065075 A | 5/2011 |
| EP | 1203080 A2 | 5/2002 |
| EP | 1206080 A1 | 5/2002 |
| EP | 1233326 A2 | 8/2002 |
| EP | 1235392 A1 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 A | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |

(56) References Cited

FOREIGN PATENT DOCUMENTS

| | | |
|---|---|---|
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I239179 | 9/2005 |
| TW | 200618653 | 6/2006 |
| TW | 200838310 A | 9/2008 |
| TW | 200943168 A | 10/2009 |
| WO | 0184291 A1 | 11/2001 |
| WO | 02010942 | 2/2002 |
| WO | 0223825 A1 | 3/2002 |
| WO | 0249314 A2 | 6/2002 |
| WO | 03030451 A1 | 4/2003 |
| WO | 03061240 A1 | 7/2003 |
| WO | WO-03104834 A2 | 12/2003 |
| WO | 2004030351 A1 | 4/2004 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | 2006007352 A1 | 1/2006 |
| WO | 2006020304 A2 | 2/2006 |
| WO | 2006135289 A1 | 12/2006 |
| WO | 2007000757 | 1/2007 |
| WO | 2007009876 A1 | 1/2007 |
| WO | 2007013334 A1 | 2/2007 |
| WO | 2007021269 | 2/2007 |
| WO | WO-2007033049 A2 | 3/2007 |
| WO | 2007098425 A1 | 8/2007 |
| WO | 2007133483 A1 | 11/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009015322 A2 | 1/2009 |
| WO | 2009040918 A1 | 4/2009 |
| WO | 2010120878 A2 | 10/2010 |
| WO | 2010126727 A2 | 11/2010 |
| WO | 2011002141 A1 | 1/2011 |
| WO | 2011003089 A1 | 1/2011 |
| WO | 2012096546 A2 | 7/2012 |

OTHER PUBLICATIONS

Byungjoo Lee, U.S. Appl. No. 61/433,942, filed Jan. 18, 2011.
Taiwan Search Report—TW096140444—TIPO—Sep. 16, 2013.
Taiwan Search Report—TW098111391—TIPO—Nov. 1, 2013.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Brandenburg, et al., AVTCore, RTCP for inter-destination media syncronization, Internet Draft, draft-ietf-avtcore-idms-092.txt, Oct. 31, 2011.
Co-pending U.S. Appl. No. 10/236,657, filed Sep. 6, 2002.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
International Search Report and Written Opinion—PCT/US2013/020155—ISA/EPO—May 24, 2013.
Kwon E., et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ USA, IEEE, Sep. 25, 2005, pp. 715-719, XP010878576, ISBN: 0-7803-9152-7 section 1. Introduction.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol. MCD, No. V1. 1. 1, Dec. 1, 2010, XP014061814, section 5.
Miller B., et al., "Mapping salutation architecture APIs to Bluetooth service discovery layer," Bluetooth White Paper, [Online} pp. 1-25, Jul. 1, 1999, XP002511956.
Mitrea M., et al., "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Myers, et al: "Collaboration Using Multiple PDAS Connected to a PC" Proceedings of the ACM Conference on Computer Supported Cooperative Work (CSCW), Nov 14, 1998, pp. 285-294, ISBN: 978-1-58113-009-6.
Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Nordbotten, N.A. et al., "Methods for service discovery in Bluetooth scatternets," Computer Communications, Elsevier Science Publishers BV, Amsterdam, NL, vol. 27, No. 11, Jul. 1, 2004, pp. 1087-1096, XP004503638.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.
Video Electronics Standards Association (VESA) Mobile Display Digital Interface Standard (MDDI), Jul. 2004.
Wenger et al., "RTP Payload Format for H.264 Video," Network Working Group, RFC 3984, Feb. 2005, 78 pp.
Yin Z., et al., "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.

(56) References Cited

OTHER PUBLICATIONS

Casner, S., et al., "Compressing IP/UDP/RTP Headers for Low-Speed Serial Links," IETF Network Working Group, RFC 2508 (Feb. 1999).
Gentric:, et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
DDJ., "Research on Windows Programming with Visual C++, Final Issue, Overcoming WIN32 Hook Processing in MFC Programming", Feb. 1996 issue (vol. 5,No. 2, No. 61 in all), Shoeisha Co., Ltd., Feb. 1, 1996, pp. 66-77.
Hayakawa A., "Operate multiple machines by remote control software", VNCThing, MAC POWER, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
"Raster Graphics" Wikipedia. Wikimedia Foundation, Jan. 29, 2011, Web, Apr. 1, 2015.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.
Wikipedia entry for UPnP List of UPnP AV media servers and clients (captured Aug. 20, 2010), pp. 1-10, Retrieved from the Internet , whole document.
Wikipedia entry of header (captured Aug. 30, 2010), 1 Page, Retrieved from the Internet , whole document.

\* cited by examiner

WIRELESS DISPLAY WITH MULTISCREEN SERVICE

This application claims the benefit of U.S. Provisional Application No. 61/583,987 filed Jan. 6, 2012 and U.S. Provisional Application No. 61/599,564 filed Feb. 16, 2012, the entire contents of which are incorporated by reference.

TECHNICAL FIELD

This disclosure relates to techniques for transmitting data between a wireless source device and other wireless devices and more particularly to the transmission of media data from the wireless source device to a wireless sink device and a wireless client device.

BACKGROUND

Wireless display (WD) or WI-FI Display (WFD) systems include a wireless source device and one or more wireless sink devices. The source device and each of the sink devices may be either mobile devices or wired devices with wireless communication capabilities. One or more of the source device and the sink devices may, for example, include mobile telephones, portable computers with wireless communication cards, personal digital assistants (PDAs), portable media players, or other such devices with wireless communication capabilities, including so-called "smart" phones and "smart" pads or tablets, or other types of wireless communication devices. One or more of the source device and the sink devices may also include wired devices such as televisions, desktop computers, monitors, projectors, and the like, that include communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its screen and audio equipment.

Server computing devices may also provide media items to client devices using various media sharing protocols. The client devices may issue playback commands to the server computing devices. In response to receiving the playback commands, the server may transmit media items, for example using streaming, to the client devices.

SUMMARY

This disclosure generally describes a system where a first wireless computing device configured as a wireless source device can communicate with a second wireless computing device configured as a wireless sink device and a wireless client computing device. As part of a communication session, the wireless source device can transmit audio and video data to the wireless sink device, and the wireless sink device can transmit user inputs received at the wireless sink device back to the wireless source device. The wireless source device may also execute a media sharing application, which enables sharing playlists of media items between the first wireless computing device and the wireless client computing device. The wireless client computing device may determine which media items that the wireless client computing device is capable of outputting. The first wireless computing device may receive media playback commands from the wireless client computing device, and may transmit the media items to the wireless client computing device in response to the playback commands.

In one example, the disclosure describes a method of transmitting content of a first wireless computing device to a second wireless computing device that includes initiating, with the first wireless computing device, a WI-FI display (WFD) connection, transmitting, with the first wireless computing device, data from the first wireless computing device via the WFD connection to the second wireless computing device, executing, with the first wireless computing device, a media sharing application that enables the first wireless computing device to share a media item of a playlist with a wireless client computing device, transmitting, with the first wireless computing device, information that describes the media item of the playlist to the wireless client computing device, wherein transmitting the information that describes the media item causes the wireless client computing device to determine if the wireless client computing device is capable of outputting the media item, and transmitting, with the first wireless computing device, the media item to the wireless client computing device.

In another example, the disclosure describes a first wireless computing device that includes a WI-FI display (WFD) module configured to initiate a WI-FI display (WFD) connection with a second wireless computing device, and transmit data from the first wireless computing device via the WFD connection to the second wireless computing device, a media sharing module configured to: execute a media sharing application that enables the first wireless computing device to share a media item of a playlist with a wireless client computing device, transmit information that describes the media item of the playlist to the wireless client computing device, wherein the transmission of the information that describes the media item causes the wireless client computing device to determine if the wireless client computing device is capable of outputting the media item, and transmit the media item to the wireless client computing device.

In another example, the disclosure describes a first wireless computing device that includes means for initiating a WI-FI display (WFD) connection with a second wireless computing device, means for transmitting data via the WFD connection to the second wireless computing device, means for executing a media sharing application that enables the first wireless computing device to share a media item of a playlist with a wireless client computing device, means for transmitting information that describes the media item of the playlist to the wireless client computing device transmitting, wherein the means for transmitting the information that describes the media item causes the wireless client computing device to determine if the wireless client computing device is capable of outputting the media item, and means for transmitting the media item to the wireless client computing device.

In another example, the disclosure describes a computer-readable storage medium. The computer-readable storage medium having stored thereon instructions that upon execution cause one or more processors to initiate a WI-FI display (WFD) connection with a second wireless computing device, transmit data from the first wireless computing device via the WFD connection to the second wireless computing device, execute a media sharing application that enables the first wireless computing device to share a media item of a playlist with a wireless client computing device, transmit information that describes the format of the media item of the playlist to the wireless client computing device, wherein the transmission of the information that describes the media item causes the wireless client computing device to determine if the wireless client computing device is capable of outputting the media item, and transmit the media item to the wireless client computing device.

DETAILED DESCRIPTION

Figure 1A:
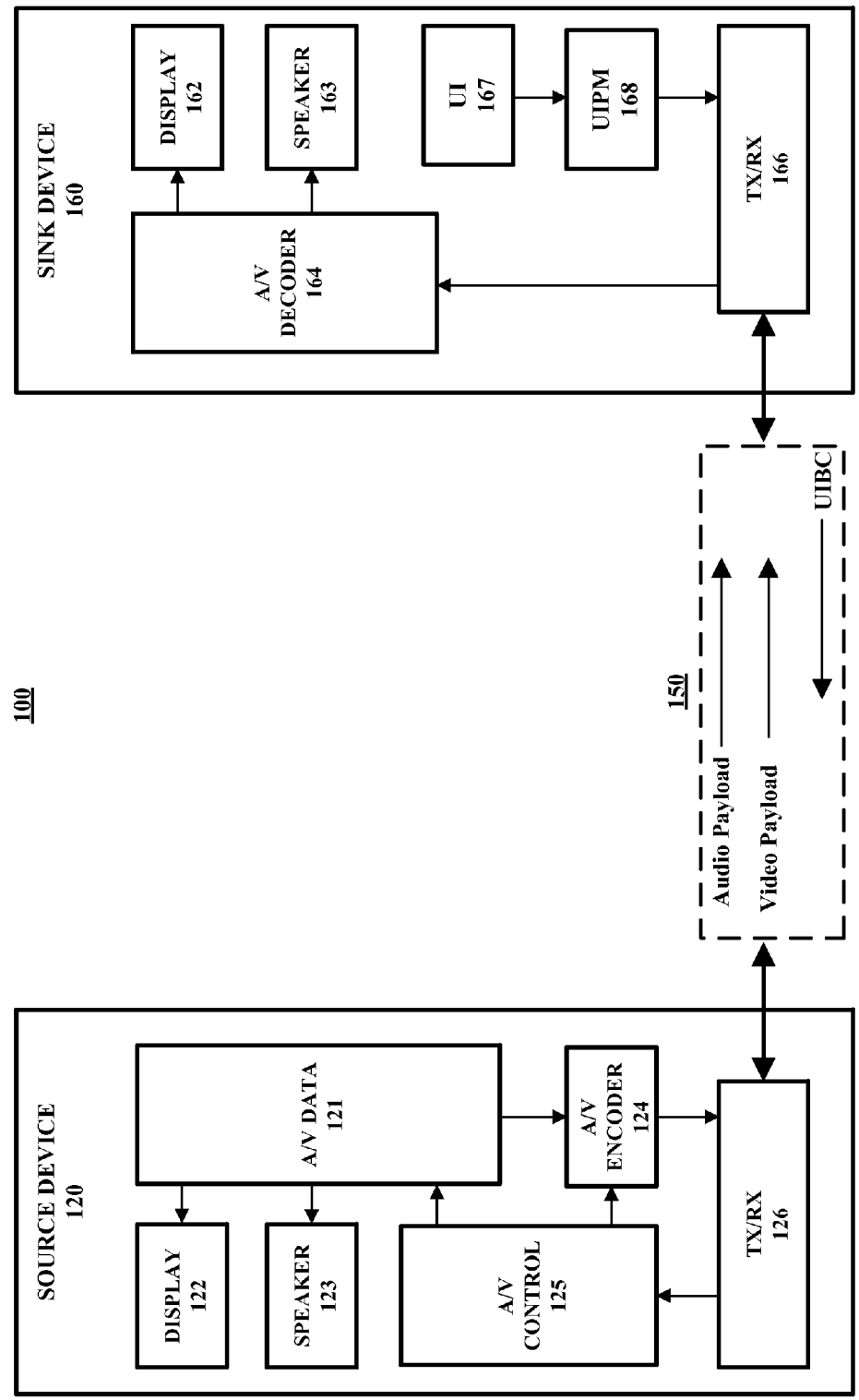
FIG. 1A is a block diagram illustrating an example of a system that includes a source/server device and a sink device system that may implement techniques of this disclosure.

WI-FI Display (WFD) may be used in a variety of applications in order to support wirelessly transmitting content. As an example, a mobile device (referred to as a "source") may be used to wirelessly transmit video content or other application data from a mobile computing device, such as a phone, tablet, smartphone, or portable digital assistant (PDA), to other devices (referred to as "sink(s)" and "clients"), which are WFD enabled. The video content or other application data may be transmitted from the source and received by the sink may be output by one or more output devices of the sink.

In this disclosure, the term source device generally refers to a device that is transmitting media data to either a sink device or a client device. As will be described in greater detail below, the term sink device generally refers to a device that is receiving media data from a source device and simultaneously rendering the same media content as the source device. The term client device generally refers to a device that is receiving media data from a source device, but unlike a sink device, a client device is not necessary simultaneously rendering the same media content as the source device. For example, a source device may stream video data or audio data to a client device even though the source device is not itself rendering the movie data or audio data. The terms source device, sink device, and client device generally refer to a state of operation for a particular device. Thus, one device may be capable of being any of a source device, sink device, or client device, and in some instances may even simultaneously function as more than one type of device. For example, a particular device may be a client device for one device but may be a source device for another device.

In an example, a user of a mobile source device may execute a media sharing application on the source device when the user enters a proximity to support WI-FI communications. The media sharing application may allow one or more users of WI-FI equipped client devices to select content to watch, listen, and/or view media items shared on the source device via WI-FI streaming. The media sharing application of the source device may also use WFD to connect with a WFD-compatible sink device in order to share contacts, or any other application data of the source device with the WFD-compatible sink device.

The media sharing application may present one or more playlists of media items, such as audio, video, pictures, etc., for streaming to the users of the client devices, which may execute a client application to communicate with the media sharing application. Users of the client devices may select media items to play from the playlists. In some examples, the client devices and the media sharing application may negotiate with each other, and only show media items in the playlists which the devices are capable of outputting. The users of the client devices may select one or more media items for playback.

The source computing device may share the playlists using one or more protocols, such as the protocols of Universal Plug and Play (UPnP). The client devices may request a stream of one or more selected media items of the playlist using a protocol, such as RTSP (Real-Time Streaming Protocol). Responsive to receiving the request for the one or more media items, the source device may stream the requested items using a protocol, such as real-time transport protocol (RTP), to the requesting client devices.

When the source device enters a proximity close enough to support wireless communications via WI-FI, the user of the source device may launch the media sharing application. The application may initiate a WFD session, which may configure the mobile device as a WFD source. The source device may connect with a WFD-compatible device (referred to as a "sink" or "sink device") by communicating wirelessly with the WFD-compatible sink device. The WFD sink device may use some authentication mechanism to ensure that the user of the sink device is authorized to connect with the sink device, such as a pre-shared key, or certificate system.

The source device, client devices, and the sink device may comprise devices such as DVD players, TVs, MP3 players, laptops, tablets, netbooks, and/or other devices that are WI-FI enabled. In some examples, the client devices and/or the sink device may be integrated into an automobile. In other examples, the client devices and/or the sink device may belong to the users and may be portable.

In one example user environment, a smartphone may operate as wireless source device and transmit media data to passengers in an automobile. The automobile may, for example, include a wireless sink device in the dashboard or control panel that allows a driver to safely view map applications or other such content while driving. The automobile may additionally include one or more client devices. For example, client devices in the back seat may enable passengers in the backseat to view a movie stored on the smartphone or to listen to music stored on the smartphone.

For purposes of explanation and example, certain aspects of this disclosure may be described with respect to a user environment inside an automobile, but the techniques of this disclosure are not limited to any particular user environment.

The WFD connection between the source device and the sink device may allow sharing of application data. In various examples, the application data may include contacts, calendar appointments, music stored on the source device, navigation data, or any other application data that the user of the source device may want access to. In addition to providing application data to the WFD-enabled device of the automobile, the source device may also perform screen mirroring with the sink device in accordance with the WFD draft specification, which is currently under development. When performing mirroring, the display of the source device may be sent to the sink device in real-time, such that the sink device and the source device are in sync.

WFD mirroring refers to the device transmitting image data at a source to a sink device, which displays the transmitted image data in real-time. In addition to transmitting image data between a source and a sink, WFD also allows a source device to transfer input commands to the sink device, and the sink device to transmit input commands from the sink to the source, as described below using a user input back channel (UIBC). In an example, the sink device may also receive playlists of media items, via WFD. The sink device may receive transmit user input commands to the source device that select media items for playback. In response to receiving the media commands, the source device may transmit the requested media items to the sink device.

In the context of the present disclosure, the WFD sink device may comprise one or more processors, memory, one or more storage devices, input and/or output devices, a wireless module capable of WI-FI communications. As stated above, when the source device connects to the sink device, the sink device may display the interface of the source device. In the example where the sink device comprises a device of an automobile, and the source device comprises a device of a driver of the automobile, the sink device may include a larger screen than the source device. This in turn, may be beneficial from a safety standpoint for the driver. By using a built-in output device of the automobile as a wireless sink device, the driver may avoid having to look away from the road to see the display of the source device.

In various examples, the user of the sink device may issue user input commands to the source device. In some examples, the input commands may include mouse clicks, scrolling actions, keyboard input, or any other type of user input. The input device of the sink may comprise a touch screen and/or a voice command system, e.g. via BLUETOOTH in some examples.

Responsive to receiving user input, the sink device may transmit the user input back to the source device via a UIBC of the data connection between the source and sink. Responsive to receiving the user input from the sink device, the source device may accept the user input and take an action, such as scrolling, accepting mouse and/or keyboard input, or acting in response to a voice command.

In the automobile user environment, the driver may utilize the sink device in a variety of ways in order to interact with the contents of the source device. In various examples, the user may interact with the sink device, and the interaction may cause the source device to make phone calls, access contact information, change musical selections, access calendar and/or scheduling data, access the internet, access navigation data and/or services, or perform other actions. Additionally, in some examples, various input and output of the source device may be redirected to various devices connected to the sink device. For instance, if the driver is making a phone call, the driver may speak into one or more microphones which may be connected to the sink device in order to facilitate the ease of making the phone call. Additionally, the audio of the phone call may be redirected from the source device through the speakers of the car, which are connected to the sink device, to provide better audio call quality and ease of listening for the driver.

As stated above, users of the client devices may also access content of the source device via the media sharing application. In an example, before a user of a client device (e.g. a backseat passenger) may access content on the source device, the user of the source device (e.g. the driver) may setup a playlist for the user of the client device. The playlist may include a variety of media that the users of the client devices may select from to watch and/or listen. The playlist may, for example, include various compressed video files, audio files, images, or any other content that may be displayed by the output devices of the client devices. Multiple output devices, e.g. multiple WI-FI-equipped client devices may be able to simultaneously connect to the media sharing application of the source device and the source device may transmit multiple simultaneous media streams to each of the client devices. In this manner, each user of a client device may be able to access different media items simultaneously according to the preferences of each user.

Using one or more input and output devices of a client device, such as a touch screen display, mouse, keyboard, etc., a user of the wireless client device may connect via WI-FI to the media sharing application running on the source device. In some examples, the WI-FI connection may be established using WI-FI direct. In another example, an automobile may provide a wireless network to which the source device and the client devices may connect to, and over which data to and from the source and client devices may be transferred. In some examples, the client devices may include a WI-FI module, processor, memory, storage, and one or more additional input devices, may allow a user to select media from the playlist of the source device.

Once a user of a client device has selected one or more media items from the playlist, the source device may begin streaming a selected media item via a WI-FI connection to the client device. After the media item has finished playing, the next media item from the playlist may stream to the output device until the playlist is complete. In some examples, a user of the client device may utilize user input with the client device to select a different media item from the media server of the source device. The user may also perform additional playback commands, such as "start," "stop," "fast forward," etc. in order to control the playback of media on the client device.

FIG. 1A is a block diagram illustrating an exemplary system 100 that may implement techniques of this disclosure. As shown in FIG. 1A, system 100 includes source device 120 that communicates with sink device 160 via communication channel 150. Source device 120 may comprise a device such a netbook, tablet, smartphone, PDA, or any similar mobile device capable of supporting WFD. Source device 120 may include a memory that stores audio/video (A/V) data 121, display 122, speaker 123, audio/video encoder 124 (also referred to as encoder 124), audio/video control module 125, and transmitter/receiver (TX/RX) unit 126. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example configuration for system 100. Other configurations may include fewer components than those illustrated or may include additional components than those illustrated.

In the example of FIG. 1A, source device 120 can display the video portion of audio/video data 121 on display 122 and can output the audio portion of audio/video data 121 on speaker 123. Audio/video data 121 may be stored locally on source device 120, accessed from an external storage medium such as a file server, Blu-ray disc, or DVD. In some instances audio/video data 121 may be captured in real-time via a camera and microphone of source device 120 such that phone audio or video may be captured or played back via an audio system of an automobile. Audio/video data 121 may include multimedia content such as movies, television shows, or music, but may also include real-time content generated by source device 120. Such real-time content may for example be produced by applications running on source device 120. As will be described in more detail, such real-time content may in some instances include, in some examples, a video frame of user input options available for a user to select. In some instances, audio/video data 121 may include video frames that are a combination of different types of content, such as a video frame of a movie or TV program that has user input options overlaid on the frame of video.

In addition to rendering audio/video data 121 locally via display 122 and speaker 123, audio/video encoder 124 of source device 120 can encode audio/video data 121, and transmitter/receiver unit 126 can transmit the encoded data over communication channel 150 to sink device 160. Sink device 160 may comprise a device that includes a touch-screen display, which may be mounted in a convenient location of an automobile for driver interaction. Transmitter/receiver unit 166 of driver sink device 160 receives the encoded data, and audio/video decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 124 may also perform other encoding functions in addition to implementing a video compression standard as described above. For example, A/V encoder 124 may add various types of metadata to A/V data 121 prior to A/V data 121 being transmitted to sink device 160. In some instances, A/V data 121 may be stored on or received at source device 120 in an encoded form and thus not require further compression by A/V encoder 124.

Although, FIG. 1A shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC).

Display 122 and display 162 may comprise any of a variety of video output devices such as a cathode ray tube (CRT), a liquid crystal display (LCD), a plasma display, an organic light emitting diode (OLED) display, or another type of display device. Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, driver device 160 and sink device 120 are similar devices, e.g., both being smartphones, tablet computers, or the like. In this case, one device may operate as the source and the other may operate as the sink. These rolls may even be reversed in subsequent communication sessions.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to WI-FI, BLUETOOTH, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link. Source device 120 and sink device 160 may communicate over communication channel 150 using a communications protocol such as a standard from the IEEE 802.11 family of standards. The techniques of this disclosure may at times be described with respect to WI-FI, but it is contemplated that aspects of these techniques may also be compatible with other communication protocols.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167.

Additionally, users, e.g. passengers or a driver, of sink device 160 may be able to launch and control applications on source device 120. For example, a user of sink device 160 may be able to launch a photo editing or navigation application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may be a smartphone with a large amount of memory and high-end processing capabilities, and a user of source device 120 may use the smartphone in all the settings and situations smartphones are typically used. When watching a movie, the user may wish to watch the movie on a device with a bigger display screen, in which case sink device 160 may be a tablet computer. When wanting to send or respond to email, the user may wish to use a device with a keyboard, in which case sink device 160 may be a laptop. In both situations, the bulk of the processing may still be performed by source device 120 (a smartphone in this example) even though the user is interacting with a tablet computer or a laptop. Due to the bulk of the processing being performed by source device 120, sink device 160 may be a lower cost device with fewer resources than if sink device 160 were being asked to do the processing being done by source device 120.

In some configurations, A/V control module 125 may be an operating system process being executed by the operating system of source device 120. In other configurations, however, A/V control module 125 may be a software process of an application running on source device 120. In an example, A/V control module 125 may include a media server capable of WIFI media streaming and a WFD module. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. In one example, the OSI communication includes seven layers (1—physical, 2—data link, 3—network, 4—transport, 5—session, 6—presentation, and 7—application). In this example, being above transport layer refers to layers 5, 6, and 7. To promote reliable transmission and in sequence delivery of data packets containing user input data, UIBC may be configured run on top of other packet-based communication protocols such as the transmission control protocol/internet protocol (TCP/IP) or the user datagram protocol (UDP).

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and automobile sink devices to exploit the protocol. Generic input formats may be defined, and platform specific input formats may both be supported, thus providing flexibility in the manner in which user input can be communicated between source device 120 and sink device 160 by the UIBC.

In an example, sink device 160 may establish a WFD connection with source device 120 and source device 120 may transmit information that describes one or more media items of a playlist to sink device 160. Playlists and media items are described in further detail below, e.g., with respect to FIGS. 2A-2D. Sink device 160 may determine which media items that sink device 160 is capable of outputting. Sink device 160 may output the playlist and receive user input selections of one or more media items. Sink device 160 may transmit the selections of the media items to source device 120, which may transmit (e.g., stream) the selected media items to sink device 120.

In the example of FIG. 1A, source device 120 may comprise a smartphone, tablet computer, laptop computer, desktop computer, WI-FI enabled television, or any other device capable of transmitting audio and video data. Sink device 160 may likewise comprise a smartphone, tablet computer, laptop computer, desktop computer, WI-FI enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device.

For this disclosure, the term source device is generally used to refer to the device that is transmitting audio/video data, and the term sink device is generally used to refer to the device that is receiving the audio/video data from the source device. In many cases, source device 120 and sink device 160 may be similar or identical devices, with one device operating as the source and the other operating as the sink. Moreover, these rolls may be reversed in different communication sessions. Thus, a sink device in one communication session may be a source device in a subsequent communication session, or vice versa.

Figure 1B:
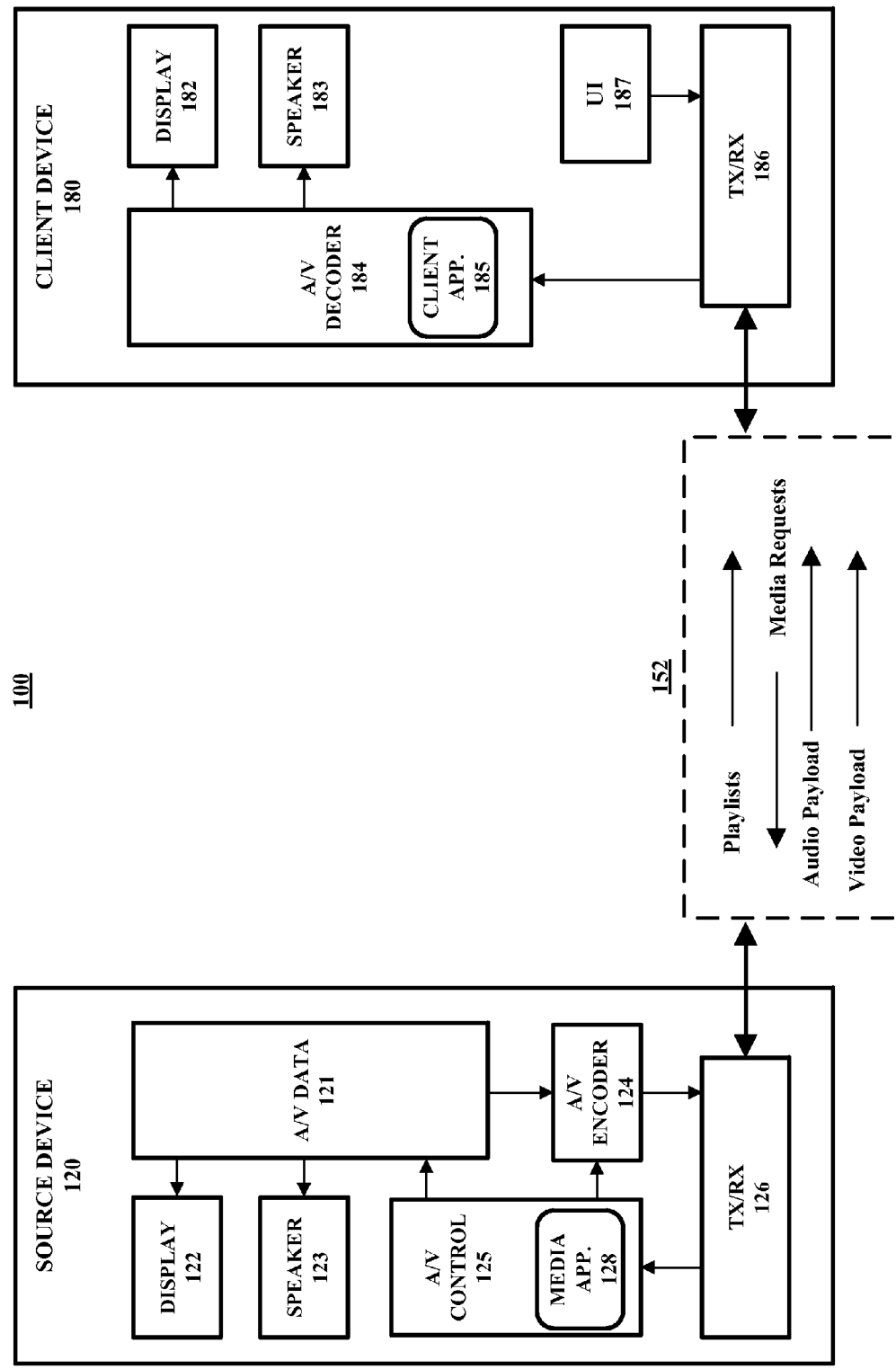
FIG. 1B is a block diagram illustrating an example of a system that includes a source device and a client device.

FIG. 1B is a block diagram illustrating an example of a system that includes a source device and a client device that may implement the techniques of this disclosure. In the system of FIG. 1B, source device 120 may communicate with a client device 180 via communication channel 152. Client device 180 and sink device 160 may be the same device or may be different devices. Communication channel 152 may comprise a wireless communication channel, similar to WI-FI or the like. Source device 120 may communicate with client device 180 over communication channel 152 using one or more protocols, such as the UPnP set of protocols, UDP, RTSP and/or RTP. In some examples, streaming the data from source device 120 to client device 180 using UPnP, UDP, RTSP, and/or RTP may allow source device 120 and client device 180 to transmit content items with reduced power consumption and may require less computational complexity relative to transmitting the media item using a different protocol, such as WFD.

Source device 120 may share one or more available playlists with one or more devices, such as client device 180. Source device 120 may further transmit information that describes at least one media item of a playlist to client device 180. The transmission of the information may cause client device 180 to determine if wireless client device 180 is capable of outputting the at least one media item. A user of client device 180 may request one or more media items of the one or more of the playlists from driver source device 180. Responsive to receiving the requests for the one or more media items, source device 120 may stream or transmit the requested media items to client device 180, and client device 180 may output the requested media items on an output device, such as display 182, and/or speaker 183.

Source device 120 of FIG. 1B may be identical to driver source 120 of FIG. 1A. Source device 120 may include display 122, audio video data 121, speaker 123, audio/video control 125, audio/video encoder 124, and transmit/receive unit 126. Client device 180 may be similar or identical to sink device 160 of FIG. 1A. Client device 180 may include audio/video decoder 184, display 182, speaker 183, user input devices 187, and transmit/receive unit 186.

Audio/video control unit 125 may be configured to execute a media sharing application 128 with one or more processors of source device 120. Media application 128 may be part of an operating system or a standalone application of source device 120, in some examples. Media sharing application 128 may determine one or more playlists to share with client computing devices, such as client computing device 180. The media items of the playlists may be stored on local storage, including hard drives, flash memory, and/or peripherals connected to source device 120. Additionally, the media items of the playlists may be accessed remotely by source device 120. Examples of such remotely accessible may include media items stored on a cloud, streaming video, or media items stored on a file server.

Responsive to the user of driver source device launching media sharing application 128, media sharing application 128 may broadcast the playlists to one or more client devices, such as client device 180. In some examples, media sharing application 128 may broadcast the playlists using one or more of the protocols of the UPnP set of protocols. Although described with respect to UPnP, media sharing application 128 may use any mechanism compatible with the wireless communication protocol to broadcast the playlists to client devices, such as client device 180. Source device 120 may announce its services (i.e. that driver source device offers streaming services using RTSP and RTP) using Simple Service Discovery Protocol (SSDP), which is the protocol of UPnP that provides for services discovery of devices on a network. The use of SSDP as a discovery protocol is but one example, and should be considered non-limiting. Other protocols and set of protocols, such as Universal Datagram Protocol (UDP), BONJOUR, Service Location Protocol (SLP), Web Services Dynamic Discovery (WS-Discovery), and Zero configuration networking (zero-conf) may also enable client devices to discover the streaming services provided by source device 120. In the example where source device 120 uses UDP to transmit the playlists, source device 120 may transmit the playlists using a particular port, broadcast address or a well-known multicast address such that one or more client devices, such as client device 180 may listen for the playlists transmitted by source device 120.

Client device 180 may be similar to sink device 160 of FIG. 1B, and may comprise a mobile computing device, such as a tablet, PDA, laptop, netbook, DVD player, or another computing device. A user of client device 180 may launch client application 185. Client application 185 may receive one or more announcements from media sharing application 128 via communication channel 152. Responsive to receiving the announcements, media sharing application 128 may parse the announcement messages and determine the services that media sharing application 128 provides. In some examples, client device 180 may determine that media sharing application 128 provides media streaming and playlist sharing capabilities, for example using RTSP and/or RTP.

The service announcements received by client application 185 may also include one or more playlists of media items or a link to a resource location that contains one or more playlists of media items, such as a URL, network path, etc. If a link to the playlists is included in the service announcement, client application 185 may retrieve the playlists shared by media sharing application 128 from the location.

Each of the one or more playlists may contain a list of one or more media items, which can be streamed from driver device 120 to client device 180. Each playlist may also include a user identifier, which may be used to restrict access to one or more users to a specific playlist. Each playlist may include one or more properties for each of the one or more media items. The properties may generally include information, such as a name, length, resolution, frame rate, profile level, bitrate, and/or file format for each media item, as some examples. The properties of the playlist and the media items are described in further detail below with respect to FIGS. 2A-2D.

Upon receiving one or more playlists, client application 185 may output the playlists to a user of client device 180 with display 182. Display 182 may comprise any of a variety of video output devices such as a cathode ray tube (CRT), a liquid crystal display (LCD), a plasma display, an organic light emitting diode (OLED) display, or another type of display device. Client device 180 may receive user inputs selecting one of the playlists from user input devices 187. User input devices 187 may, for example, be a keyboard, mouse, trackball or track pad, touch screen, voice command recognition module, or any other such user input device.

Responsive to receiving the playlists, client application 185 may determine which media items of the playlists are capable of being output by client device 180, and present the media items capable of being output by client device 180 to the user of client device 180 using display 182. To determine which of the media items client device 180 is capable of playing, client application 185 may query the operating system for installed codecs, digital rights management (DRM) capabilities, and/or the hardware capabilities of client device 180 and compare the capabilities of client device 180 with attribute information included in the playlists and the media items of the playlists.

Client application 185 may display the media items from the selected playlist that client device 180 is capable of playing to the user of client device 180 using display 182. The user of client device 180 may select one or more media items from the playlist for playback with user input devices 187. Responsive to receiving the selections for the one or more media items, client application 185 may cause transmit/receive unit 186 to create a playback request for one of the selected media items In some examples, the playback request may be request that source device 120, play, pause, stop, record, etc. the selected media item. Transmit/receive unit 186 may transmit the requests for the selected media items to transmit/receive unit 126 over communication channel 152.

If the user of client device 180 selects multiple media items from the playlist, client application 185 may issue a playback request for a first one of the selected media items, and may enqueue requests for the rest of the selected media items such that once the playback of the first media items completes, client application 185 requests one of the enqueued media items for playback, streams the requested media item, and repeats the process of requesting and streaming the enqueued media items until all the enqueued media items have been requested and streamed.

In an example, client device 180 may be connected with source device 120 using a WFD connection. Client device 180 may receive display information (e.g., graphical representations) that, when rendered by client device 180, illustrates the playlists that the one or more playlists that further contain the one or more media items. Client device 180 may output the display information to a user of client device 180 using display 182, and a user of client device 180 may select one or more media items for playback using UI 187. In an example, client device 180 may receive the playlists, which comprise information that describes one or more media items using a WFD connection. UI 187 receive and transmit user input commands that select one or more media items over a UIBC to source device 120.

Responsive to receiving a request or media playback command, such as an RTSP PLAY request or a UIBC user input command from client device 180, for one or more media items, media sharing application 128 may cause transmit/receive unit 126 may construct a stream of the requested media item. In some examples, transmit/receive unit 126 may construct an RTP session for the stream of the media item. Transmit/receive unit 126 may establish the RTP session with client device 180 and transmit the stream for the media item to transmit/receive unit 186 over communication channel 152. In the example described above where client device 180 receives information about the playlists from a WFD connection, and transmits media item selections using a UIBC, source device 120 and client device 180 may terminate the WFD connection responsive to receiving the UIBC input command that selects media items and/or playlists. Once the UIBC connection terminates, source device 120 and client device 180 may continue to communicate using RTSP, and/or RTP.

In some examples, media sharing application 128 may need to transcode the selected media item into a different format before transmitting the media item to client device 180. In such cases, media application 128 may utilize audio/video encoder 124 to re-encode the selected media format from one format to another format, e.g. from an MPEG Layer 3 audio (MP3) format to a Windows Media Audio (WMA) format.

Transmit/receive unit 186 may receive the RTP stream of the requested media item from transmit/receive unit 126. If some of the packets of the stream of the requested media item are out of order, transmit/receive unit 186 may reassemble and/or reorder the stream into a correct order. Transmit/receive unit 186 may also determine whether there are any issues with the received RTP stream, such as dropped packets, and may re-request the dropped packets from source device 120.

Client application 185 may analyze the stream and output the audio and/or video portions of the stream using display 182 and speaker 183. In this manner, the audio and video data being rendered by display 182 and speaker 183 can be simultaneously rendered by display 182 and speaker 183. The audio data and video data may be arranged in frames, and the audio frames may be time-synchronized with the video frames when rendered. If client application 185 determines that the stream of the media item needs to be decoded, client application 185 may utilize audio/video decoder 184 to decode the encoded stream before outputting the stream.

Figure 1C:
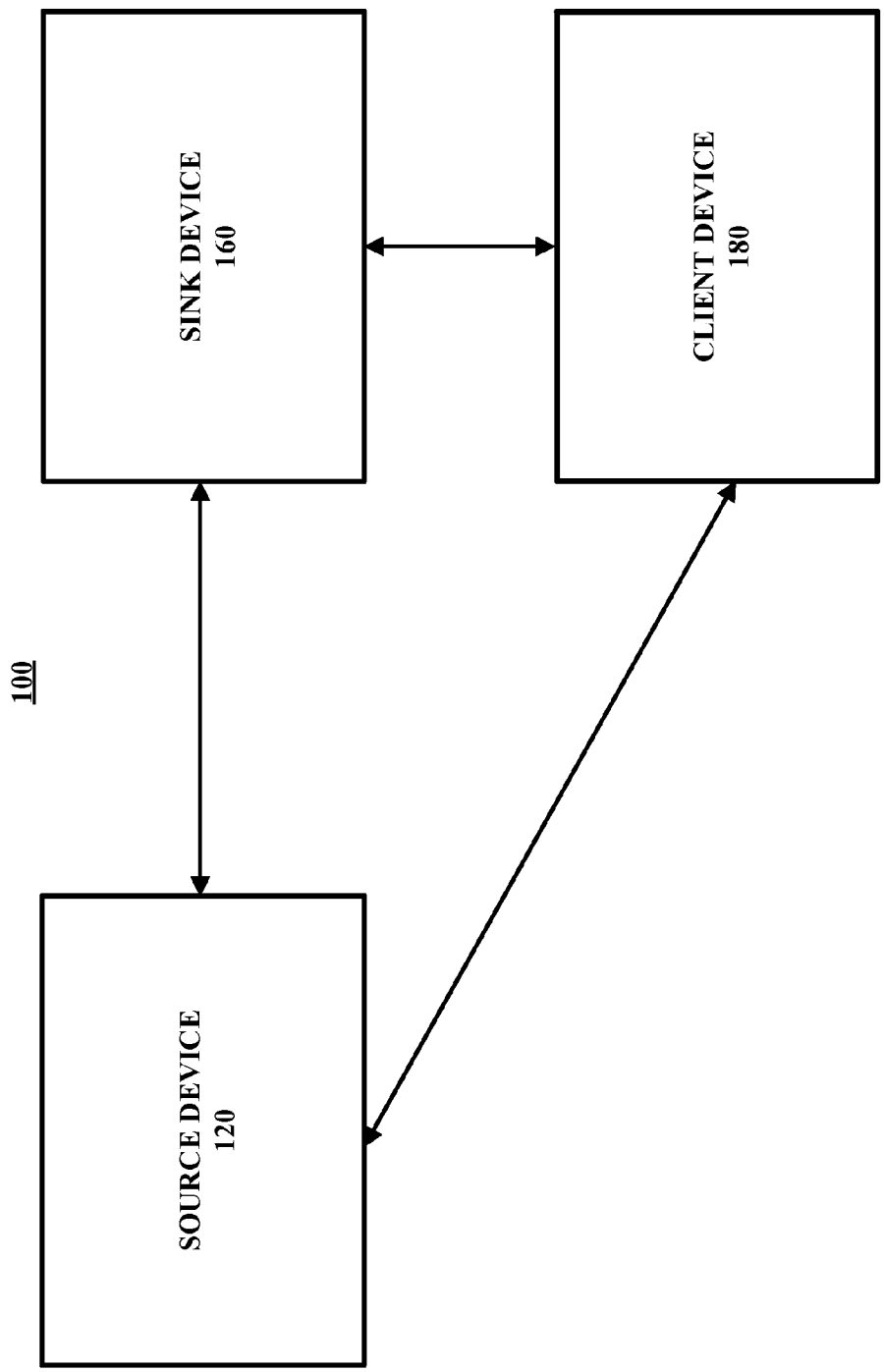
FIG. 1C is a block diagram illustrating an example of a system that includes a source device, a sink device, and a client device.

FIG. 1C is a block diagram illustrating an exemplary system 101 that may implement techniques of this disclosure. System 101 includes source device 120 and sink device 160, each of which may function and operate in the manner described above for FIG. 1A. System 101 further includes client device 180. As described above, client device 180 may be any device capable of wirelessly connecting with source device 120 and streaming media from media sharing application 128 of source device 120. Sink device 160 may receive audio and video data from source device 120 via WIFI, for example using streaming protocols, such as RTSP and/or RTP. In some configurations, sink device 160 and client device 180 may operate independently of one another, and audio and video data output at source device 120 may be simultaneously output at sink device 160 and client device 180. Although sink device 160 and client device 180 are illustrated as separate devices, they may be the same device. Although system 101 is illustrated as having only a single client device 180, this is merely an example and should not be limiting. Additional devices similar to client device 180 may also be present in system 101.

Figure 2C:
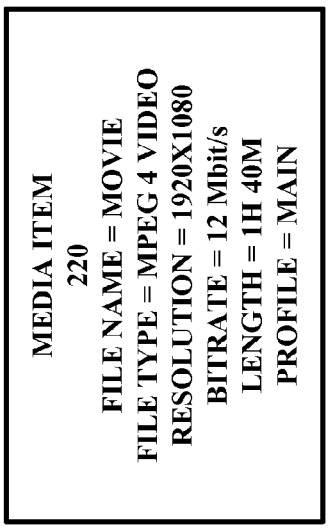
FIG. 2C and FIG. 2D are conceptual diagrams illustrating two examples of attributes and values associated with media items.
Figure 2D:
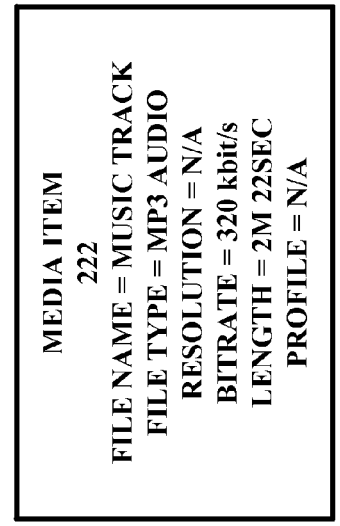
Figure 2B:
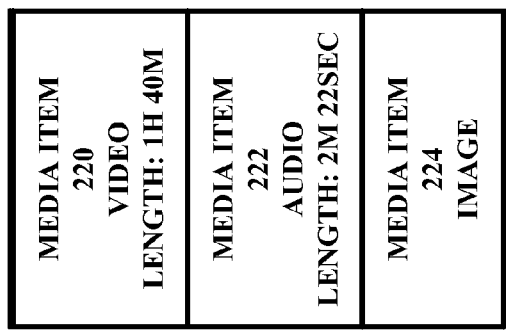
FIG. 2B is a conceptual diagram illustrating a playlist that includes media items.
Figure 2A:
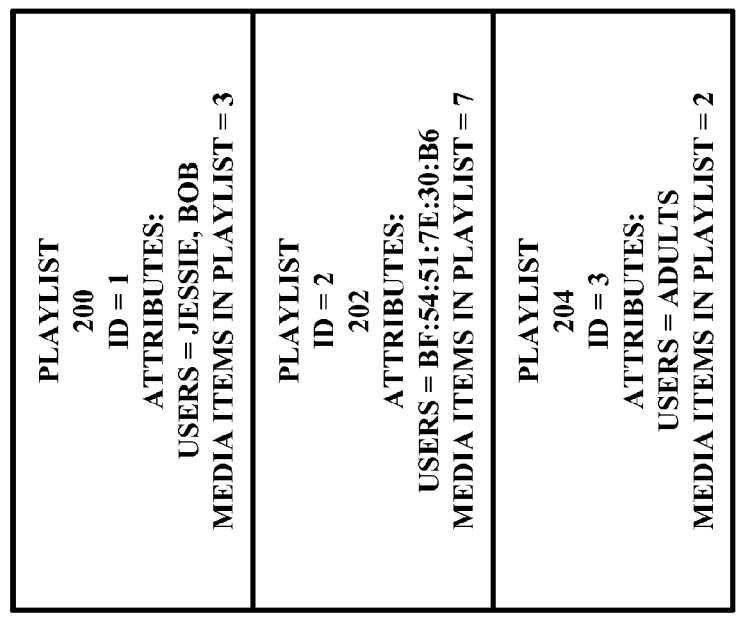
FIG. 2A is a conceptual diagram illustrating playlists of media items.

FIG. 2A is a conceptual diagram illustrating playlists of media items in accordance with the techniques of this disclosure. FIG. 2A illustrates three example playlists, playlist 200, 202, and 204. Each of the playlists may comprise a playlist of media items as described above in the examples of FIGS. 1A-1C. Playlists 200, 202, and 204 may also include one or more associated attributes that describe the properties of the associated playlist. Each of playlists 200, 202, and 204 may include one or more media items, such as audio, video and picture media items. The media items may also include attributes or meta-data, which describe the properties of the media items.

Each of the one or more attributes of playlists 200, 202, and 204 may generally have an identifier. The identifier may be associated with a list of one or more values. As an example, playlists 200, 202, 204 may include a "number" attribute. The number attribute may indicate the number of media items associated with each playlist that a client device may stream from source device 120 to client device 180. As another example, playlists 200, 202, 204 may also include a "users" attribute. The users attribute may be associated with a list of one or more users, groups of users, and/or devices that are permitted to stream the media items associated with a particular playlist.

In some examples, the values associated with the access attribute may comprise a username of a particular user that is allowed to stream the media items of the playlist. As an example, in FIG. 2A, playlist 200 may include the usernames "Jessie," and "Bob," which indicate that playlist 200 should be accessible to users "Jessie" and "Bob." In some other examples, the values associated with the access attribute may comprise an identifier of a device. For instance, the device identifier may comprise an IP address, Machine Access Control (MAC) address, or another hardware that identifies a particular device. In some other examples, the access attribute may comprise a group identifier that corresponds to a group of one or more users.

Media sharing application 128 may authenticate a client device identified with a hardware identifier by comparing the hardware identifier (e.g. MAC address) provided by the client device to media sharing application 128. In the example of FIG. 2A, playlist 202 the users attribute is associated with a MAC address ("BF:54:51:7 E:30:B6"). Media sharing application 128 may compare the MAC address of a client device, e.g. client device 180, with the MAC address(es) associated with playlist 202. If the provided identifier matches one of the identifiers (e.g. MAC addresses) associated with the users attribute, media sharing application 128 may grant access to client device 180.

Media sharing application 128 may authenticate a user of a client device, e.g. client device 180 using a variety of different authentication mechanisms. In some examples, client application 128 may request authentication information, e.g., a username and password, from client device 180. Responsive to receiving a username and password from client device 180, media sharing application 128 may compare the received username and password with the usernames associated with the users attribute. In an example, the users attribute of playlist 200 includes associated users "Jessie" and "Bob." Media sharing application 128 may request a username and password from client application 185, and may receive a response that includes username "Bob," and a password for user Bob. Media sharing application 128 may determine that username Bob is included in the users attribute. Media sharing application 128 may then compare a locally stored password to the password supplied by client device 180 to determine whether the supplied password matches the stored password. If the supplied password matches the stored password, media sharing application 128 may authenticate client device 180, and grant access to (i.e. allow streaming of) media items of playlist 200 to client device 180. Media sharing application 128 may store the passwords of the users in a database or local storage of source device 120. In some examples, media sharing application 128 may utilize an authentication technique, such as a certificate system to authenticate users or devices. In other examples, In the example of FIG. 2A, the users attribute of playlist users 204 includes an identifier, "Adults," that may indicate that a group of one or more users are allowed to access the media items of playlist 204. In this example, the group "Adults" may indicate that a group of users corresponding to adults, and excluding children, is permitted to stream the media items of playlist 204. Excluding users, e.g. children, may be useful in preventing people from streaming content that is not appropriate for the excluded group of users, or in restricting access only to users that should have access to playlists of sensitive or privileged media items.

Although the users attribute of playlists 200, 202, 204 is illustrated as a list of users or devices that are allowed access to the media items of playlists 200, 202, 204, the users attribute of a particular playlist may alternatively include lists of users and/or devices that are excluded from accessing the media items of the playlist. In some examples, the playlist may include a list of users that are permitted to access the media items of the playlist and a list of users that are denied access to the particular playlist.

FIG. 2B is a conceptual diagram illustrating a playlist that includes media items in accordance with the techniques of this disclosure. FIG. 2B illustrates the media items associated with playlist 200. FIG. 2B includes three media items 220, 222, 224. Media items, such as those of playlist 200, may comprise any type of media that may be transmitted wirelessly. In the example of FIG. 2B, media item 220 may be video media, such as H.264 video, MPEG (Motion Picture Experts Group) video, or other video formats. Media item 222 may be audio media, such as an MP3, WMA, OGG Vorbis, FLAC (Free Lossless Audio Codec), or other compressed or uncompressed media format. Media item 224 may be an image file, such as a raw, JPEG (Joint Picture Experts Group), BMP (Bitmap), or TIFF (Tagged Image File Format) image format, or another image media format. Although not illustrated in FIG. 2B, other media formats, such as document, web page, and drawing media formats may also be included as media items with in a playlist.

FIG. 2B may also represent an example interface, for example of client application 185, illustrating playlist 200 that may be presented to a user of client device 180. Responsive to receiving a user input from one of user input devices 187 (FIG. 1A, FIG. 1B), a client device may request that source device 120 perform a playback command related to one or more of media items 220, 222, and/or 224, of playlist 200. In an example, the playback commands may comprise one or more RTSP commands, such as PLAY, STOP, PAUSE, RECORD, etc. and/or other RTSP commands or requests. Although described with respect to RTSP, client device 185 may utilize other protocols for controlling media playback from source device 120.

Responsive to receiving the one or more playback commands, media sharing application 128 may perform actions in accordance with the requested playback command. As an example, if client application 185 transmits an RTSP PLAY command to media sharing application 128, requesting that media sharing application 128 play media item 200, media sharing application 128 may respond by sending a stream corresponding to the requested media item 202 to client application 185. As another example, if media sharing application 128 receives an RTSP STOP command, media sharing application 128 may stop streaming a media item, such as media item 222, that is currently playing. In addition to using RTSP for controlling the playback of media items, the streams of media items sent from source device 120 to client device 180 may generally use a different protocol, such as RTP, to stream the actual media items, while using RTSP to control the RTP streams.

FIG. 2C and FIG. 2D are conceptual diagrams illustrating two examples of attributes and values associated with media items in accordance with the techniques of this disclosure. FIGS. 2C and 2D illustrate some of the attributes and values associated with media items 220 and 222. Each of media items 220, 222, 224 may have one or more associated attributes. Each of the associated attributes may have one or more associated values. The format of the attributes of media items 220, 222, and 224 may generally be similar to the format of the attributes of playlists 200, 202, 204, where the attribute has an identifier, which is associated with a list of one or more values.

In general, media items may have file name, file type, resolution, bit rate, length, and/or profile attributes. The file name attribute may indicate the file name or title of the media item. The file type attribute may indicate whether the media item is of video, audio, or another file format. In some examples, the file type attribute may also indicate more specific information, such as a specific type of audio or video, etc. (e.g. H.264 or MP3) of the media item.

The resolution attribute may indicate the horizontal and vertical resolution of a media item. Source device 120 and client device 180 may negotiate a set of one or more resolutions client device 180 is capable of outputting based on the resolution attributes of one or more media items. As part of this negotiation process, source device 120 and client device 180 can agree on a negotiated screen resolution. When client device 180 streams data associated with a media item, such as streaming video, source device 120 can scale or transcode the video data of the media item to match the negotiated screen resolution. In this manner, client device 180 may receive video data with the agreed upon resolution. By providing client device 180 with video in the agreed upon resolution, client device 180 may not have to transcode the video data of the media item, which may consume additional power and/or processing cycles.

In FIG. 2C, the resolution of media item 220 is 1920× 1080 pixels In one example, if client device 180 has a 1280×720 resolution and source device 120 has a 1600×900 resolution, the devices may, for example, use 1280×720 as their negotiated resolution. The negotiated resolution may be chosen based on a resolution of client device 180, although a resolution of source device 120 or some other resolution may also be used. In the example where the sink device of 1280×720 is used, client device 180 can scale obtained x-coordinates by a factor of 1600/1280 prior to transmitting the coordinates to source device 120, and likewise, client device 180 can scale obtained y-coordinates by 900/720 prior to transmitting the coordinates to source device 120. In other configurations, source device 120 can scale the obtained coordinates to the negotiated resolution. The scaling may either increase or decrease a coordinate range based on whether client device 180 uses a higher resolution display than source device 120, or vice versa. In FIG. 2D, the resolution attribute of media item 222 has no value (N/A) because media item 222 is an MP3 audio file, which does not have a resolution. Media items may also include a bit rate attribute, which may indicate the streaming bitrate of a media item. In FIG. 2C, Media item 220 has a bit rate of megabits/second (12 Mbit/s). Media item 222 has a bit rate of 320 kilobits/second (320 kbit/s). In a case where the media item does not have a bit rate, such as a still image or document, there may be no value associated with the bit rate attribute.

Media items 220, 222 may also have a length attribute, which indicates the playback time of the media item. Media item 220 has a length of one hour and 40 minutes (1 H 40 M). Media item 222 has a length of two minutes and 22 seconds (2 M 22 SEC). In addition to the length attribute, media items may have an associated profile attribute, which may indicate capabilities or encoding features of the media item. As an example, the value of the profile attribute value of media item 220 is "main," which may correspond to a specific profile of MPEG 4 video. Media item 222 does not have a value associated with the profile attribute because the MP3 media does not have a profile. Although described with respect to profiles of H.264 video in FIG. 2C, other profile values may also be possible.

Client application 185 may use the values of the attributes associated with media items 220, 222, 224 of playlist 200 to determine a subset of media items that client device 180 is capable of playing. Once client application 185 determines the media items that client device 180 is capable of playing, client application 185 may output only those media items of the subset of media items to the user of client device 185 that client device 185 is capable of playing. The user may select for playback only media items from the subset that client device 180 is capable of playing.

To determine which media items client device 180 is capable of playing, client application 185 may query client device 180 to determine the hardware capabilities of client device 180. Client application 185 may query the operating system as to the amount of RAM, storage space, output device resolution, sound output capabilities, processor speed, libraries installed, CODECs (coder-decoders), or any other information relevant to the playback of media items on client device 180. When client application 185 requests access a playlist, e.g. playlist 200, client application 185 may compare the attributes of playlist 200 and the attributes of the media items 220, 222, 224 of playlist 200 with the capabilities of client device 185 to determine which media items client device 180 is capable of playing.

As one example, client device 180 may have an output device capable of displaying only 1280×720 pixel video resolution. Client application 185 may determine that media item 220 has 1920×1080 resolution, and may exclude media item 220 from the media items of playlist 200 available for playback by client device 180. Alternatively, client application 185 may determine that that source device 120 can scale the video of media item 220 down to 1280×720 resolution, and may include media item 220 in the media items of playlist 200 available for playback.

In another example, client application 185 may determine a connection speed of communication link 152 between client device 180 and source device 120, e.g. 10 Mbit/s of bandwidth. Based on the connection speed, client application 185 may determine whether there is sufficient bandwidth to stream a particular media item without excessive buffering. Because media item 220 has a bit rate of 12 Mbit/s, which is greater than the available 10 Mbit/s bandwidth, client application 185 may exclude media item 220 from the list of media items of playlist 220 available for playback. Client application 185 may examine the bit rate attribute of media item 222, and because the value of 320 kbit/s is less than the 10 Mbit/s of bandwidth, may include media item 222 in the list of media items of playlist 220 available for playback.

The ability to determine which media items client device 180 is capable of playing and only presenting those media items to the user may be useful in situations where client device 180 has limited functionality. As an example, in an automobile setting, client device 180 may be hardware that is built-in to the automobile, such as a seatback media player, which may not receive updates that include newer CODECs or media profiles. As such, client device 180 may not be able to display a significant variety of media items, and the media items that client device 180 is not capable of playing should be excluded from the playlist of media items that is ultimately presented to the user.

The attributes of playlists 200, 202, and media items 220, 222, and 224 may be stored in a variety of formats. In some examples, the attributes and their associated values may be stored in XML (eXtensible Markup Language), binary, CSV (comma separate value), HTML (HyperText Markup Language), or any other format of storing records. In some examples, the attributes of the playlists and media items may be stored in the playlists themselves. In some instances, the attributes and their associated values may be stored in a separate database media sharing application 125 may index based on a unique identifier associated with each playlist and/or media item.

Figure 3:
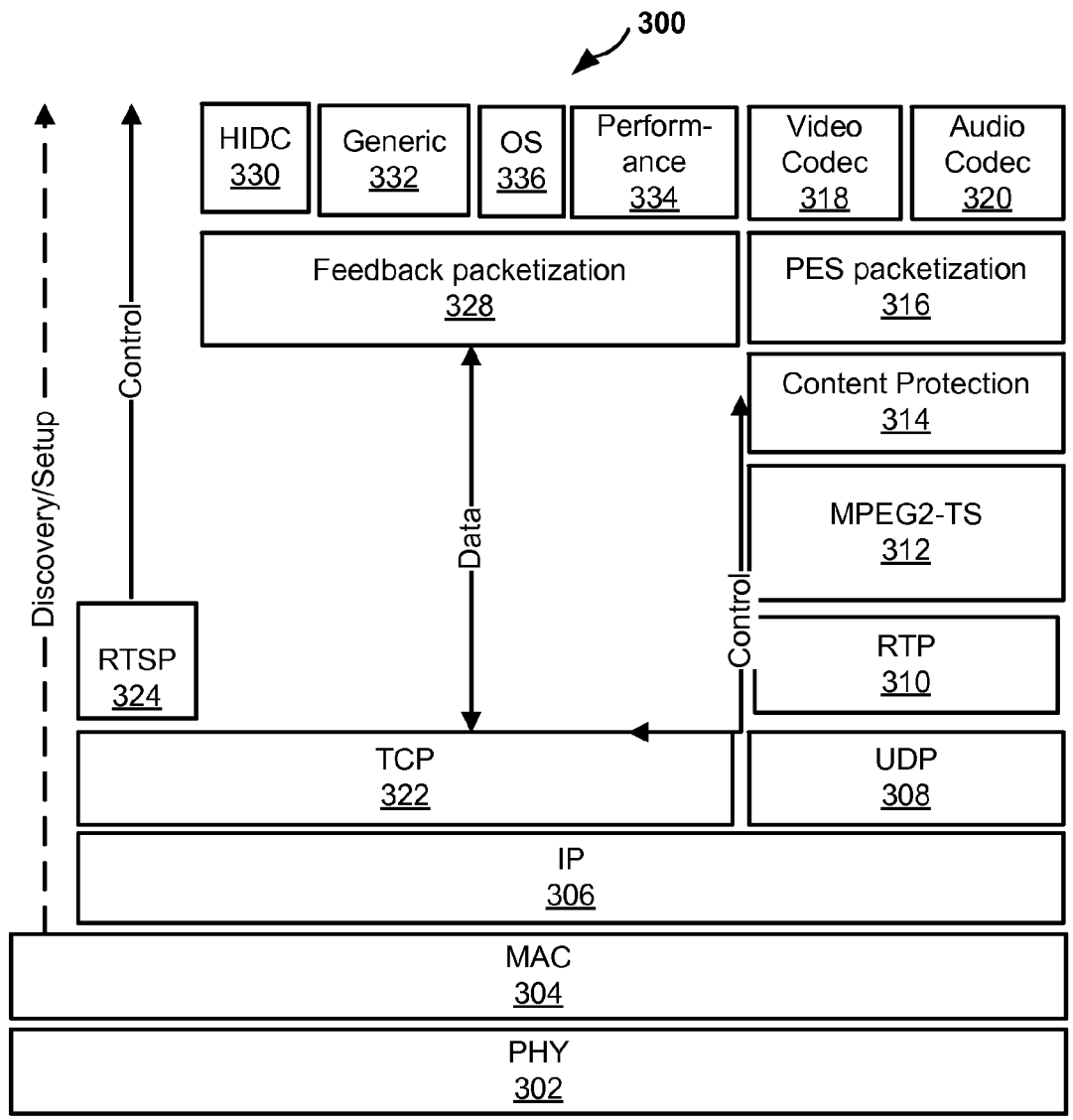
FIG. 3 is a conceptual diagram illustrating an example of a communications reference model.

FIG. 3 is a block diagram illustrating an example of a data communication model or protocol stack for a WD system. Data communication model 300 illustrates the interactions between data and control protocols used for transmitting data between a source device and a sink device in an implemented WD system. In one example WD system 100 may use data communications model 300. Data communication model 300 includes physical (PHY) layer 302, media access control (MAC) layer (304), internet protocol (IP) 306, user datagram protocol (UDP) 308, real time protocol (RTP) 310, MPEG2 transport stream (MPEG2-TS) 312, content protection 314, packetized elementary stream (PES) packetization 316, video codec 318, audio codec 320, transport control protocol (TCP) 322, real time streaming protocol (RTSP) 324, feedback packetization 328, human interface device constants 330, generic user inputs 332, performance analysis 334, and operating system (OS) 336.

Physical layer 302 and MAC layer 304 may define physical signaling, addressing and channel access control used for communications in a WD system. Physical layer 302 and MAC layer 304 may define the frequency band structure used for communication, e.g., Federal Communications Commission bands defined at 700 MHz, 2.4, GHz, 3.6 GHz, 5 GHz, 60 GHz or Ultrawideband (UWB) frequency band structures. Physical layer 302 and MAC 304 may also define data modulation techniques e.g. analog and digital amplitude modulation, frequency modulation, phase modulation techniques, and combinations thereof. Physical layer 302 and MAC 304 may also define multiplexing techniques, e.g. example, time division multi access (TDMA), frequency division multi access (FDMA), code division multi access (CDMA), or any combination of OFDM, FDMA, TDMA and/or CDMA. In one example, physical layer 302 and media access control layer 304 may be defined by a Wi-Fi (e.g., IEEE 802.11-3007 and 802.11n-3009x) standard, such as that provided by WFD. In other examples, physical layer 302 and media access control layer 304 may be defined by any of: WirelessHD, Wireless Home Digital Interface (WHDI), WiGig, and Wireless USB.

Internet protocol (IP) 306, user datagram protocol (UDP) 308, real time protocol (RTP) 310, transport control protocol (TCP) 322, and real time streaming protocol (RTSP) 324 define packet structures and encapsulations used in a WD system and may be defined according to the standards maintained by the Internet Engineering Task Force (IETF).

RTSP 324 may be used by source device 120 and sink device 160 to negotiate capabilities, establish a session, and session maintenance and management, as well as by source device 120 and sink device 160 to transmit media items in accordance with the techniques of this disclosure. For example, source device 120 may send a capability request message (e.g., RTSP GET_PARAMETER request message) to sink device 160 specifying a list of capabilities that are of interest to source device 120. Sink device 160 may respond with a capability response message (e.g., RTSP GET_PARAMETER response message) to source device 120 declaring its capability of supporting the capability. As an example, the capability response message may indicate a "yes" if sink device 160 supports the capability. Source device 120 may then send an acknowledgement request message (e.g., RTSP SET_PARAMETER request message) to sink device 160 indicating that the capability is supported. Sink device 160 may respond with an acknowledgment response message (e.g., RTSP SET_PARAMETER response message) to source device 120 acknowledging that the capability will be used during the media share session.

Video codec 318 may define the video data coding techniques that may be used by a WD system. Video codec 318 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some instances WD system may either compressed or uncompressed video data.

Audio codec 320 may define the audio data coding techniques that may be used by a WD system. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Packetized elementary stream (PES) packetization 316 and MPEG2 transport stream (MPEG2-TS) 312 may define how coded audio and video data is packetized and transmitted. Packetized elementary stream (PES) packetization 316 and MPEG-TS 312 may be defined according to MPEG-2 Part 1. In other examples, audio and video data may be packetized and transmitted according to other packetization and transport stream protocols. Content protection 314, may provide protection against unauthorized copying of audio or video data. In one example, content protection 314 may be defined according to High bandwidth Digital Content Protection 2.0 specification.

Figure 4:
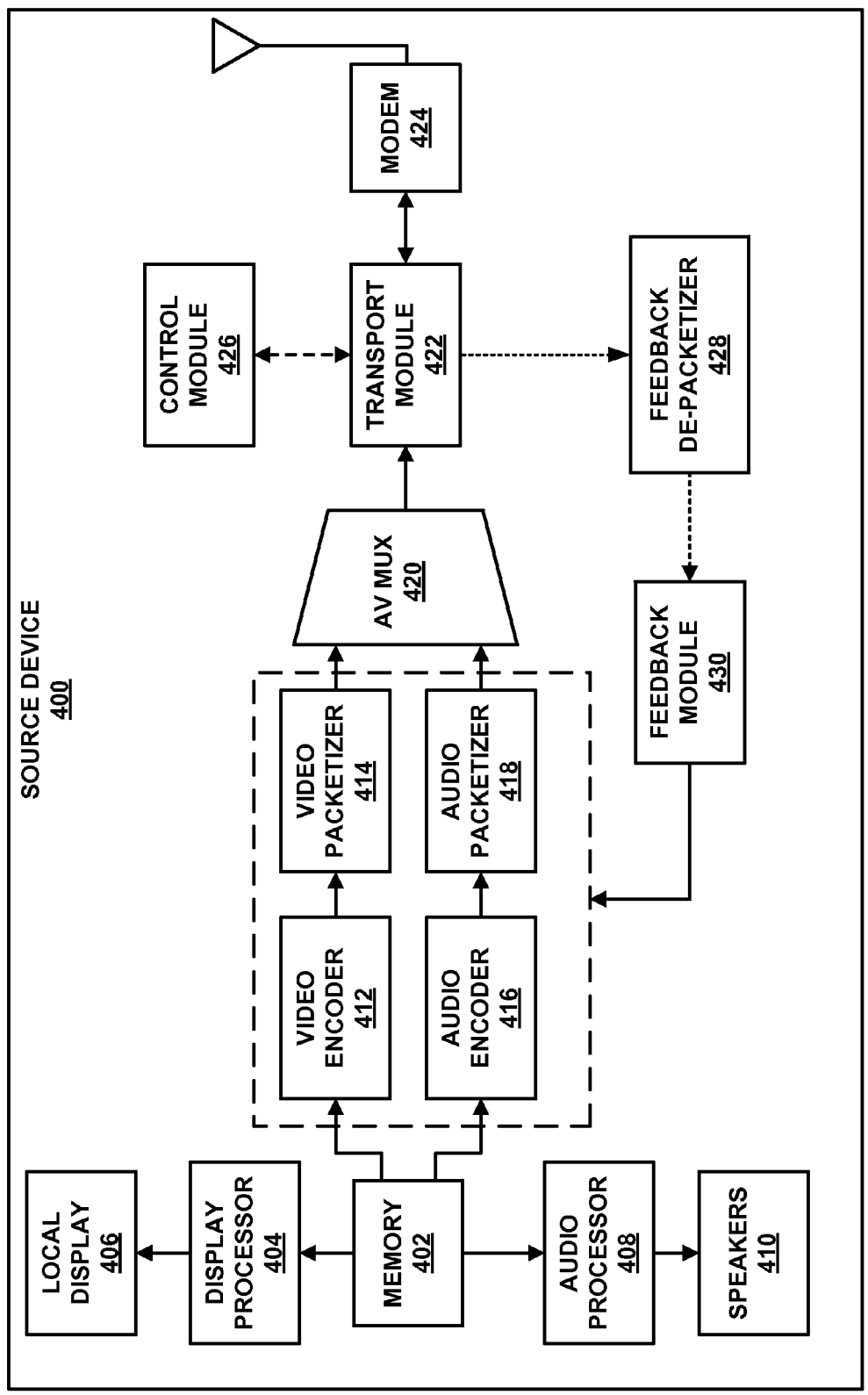
FIG. 4 is a block diagram illustrating an example of a source device that may implement techniques of transmitting video and/or application data to a sink device.

FIG. 4 is a block diagram illustrating an example of a source device that may implement techniques of transmitting video and/or application data to a sink device. Source device 400 may be part of a WD system that incorporates the data communication model provided in FIG. 3. Source device 400 may be configured to encode and/or decode media data for transport, storage, and/or display. Source device 400 includes memory 402, display processor 404, local display 406, audio processor 408, speakers 410, video encoder 412, video packetizer 414, audio encoder 416, audio packetizer 418, A/V mux 420, transport module 422, modem 424, control module 426, feedback de-packetizer 428, and feedback module 430. The components of source device 400 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Memory 402 may store A/V visual data in the form of media data in compressed or uncompressed formats. Memory 402 may store an entire media data file, or may comprise a smaller buffer that simply stores a portion of a media data file, e.g., streamed from another device or source. Memory 402 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 402 may comprise a computer-readable storage medium for storing media data, as well as other kinds of data. Memory 402 may additionally store instructions and program code that are executed by a processor as part of performing the various techniques described in this disclosure.

Display processor 404 may obtain captured video frames and may process video data for display on local display 406. Display 406 comprise one of a variety of display devices such as a liquid crystal display (LCD), a plasma display, an organic light emitting diode (OLED) display, or another type of display device capable of presenting video data to a user of source device 400.

Audio processor 408 may obtain audio captured audio samples and may process audio data for output to speakers 410. Speakers 410 may comprise any of a variety of audio output devices such as headphones, a single-speaker system, a multi-speaker system, or a surround sound system.

Video encoder 412 may obtain video data from memory 402 and encode video data to a desired video format. Video encoder 412 may be a combination of hardware and software used to implement aspects of video codec 318 described above with respect to FIG. 3. Video encoder 412 may encode the video according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some cases video encoder 412 may encode video such that video data is compressed using a lossless or lossy compression technique.

Video packetizer 414 may packetize encoded video data. In one example video packetizer 414 may packetize encoded video data as defined according to MPEG-2 Part 1. In other examples, video data may be packetized according to other packetization protocols. Video packetizer 414 may be a combination of hardware and software used to implement aspects of packetized elementary stream (PES) packetization 216 described above with respect to FIG. 3.

Audio encoder 416 may obtain audio data from memory 402 and encode audio data to a desired audio format. Audio encoder 416 may be a combination of hardware and software used to implement aspects of audio codec 320 described above with respect to FIG. 3. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Audio packetizer 418 may packetize encoded audio data. In one example, audio packetizer 418 may packetize encoded audio data as defined according to MPEG-2 Part 1. In other examples, audio data may be packetized according to other packetization protocols. Audio packetizer 418 may be a combination of hardware and software used to implement aspects of packetized elementary stream (PES) packetization 316 described above with respect to FIG. 3.

A/V mux 420 may apply multiplexing techniques to combine video payload data and audio payload data as part of a common data stream. In one example, A/V mux 420 may encapsulate packetized elementary video and audio streams as an MPEG2 transport stream defined according to MPEG-2 Part 1. A/V mux 420 may provide synchronization for audio and video packets, as well as error correction techniques.

Transport module 422 may process media data for transport to a sink device. Further, transport module 422 may process received packets from a sink device so that they may be further processed. For example, transport module 422 may be configured to communicate using IP, TCP, UDP, RTP, and RTSP. For example, transport module 422 may further encapsulate an MPEG2-TS for communication to a sink device or across a network.

Modem 424 may be configured to perform physical and MAC layer processing according to the physical and MAC layers utilized in a WD system. As described with reference to FIG. 3. Physical and MAC layers may define physical signaling, addressing and channel access control used for communications in a WD system. In one example, modem 424 may configured to perform physical layer and MAC layer processing for physical and MAC layers defined by a Wi-Fi (e.g., IEEE 802.11x) standard, such as that provided by WFD. In other examples, modem 424 may configured to perform physical layer and MAC layer processing for any of: WirelessHD, WiMedia, Wireless Home Digital Interface (WHDI), WiGig, and Wireless USB.

Control module 426 may be configured to perform source device 400 communication control functions. Communication control functions may relate to negotiating capabilities with a sink device, establishing a session with a sink device, and session maintenance and management. Control module 426 may use RTSP to communication with a sink device. Further, control module 426 may use an RTSP message transaction to negotiate a capability of source device 400 and a sink device to support capabilities of UIBC.

Feedback de-packetizer 428 may parse human interface device commands (HIDC), generic user inputs, OS specific user inputs, and performance information from a feedback packet. A feedback category field may identify a generic input category to indicate that feedback packet payload data is formatted using generic information elements. As another example, the feedback category field may identify a human interface device command (HIDC) input category. As another example, the feedback category field may identify an operating system (OS) specific input category to indicate that payload data is formatted based on the type OS used by either the source device or the sink device.

Feedback module 430 receives performance information from feedback de-packtetizer and processes performance information such that source device 400 may adjust the transmission of media data based on a performance information message.

Source device 400 provides an example of a source device configured to transmit content to a second wireless computing device. Source device 400 may initiate a WI-FI display (WFD) connection, transmit data from the first wireless computing device via the WFD connection to the second wireless computing device, execute a media sharing application that enables the first wireless computing device to share a media item of a playlist with a wireless client computing device, and transmit information that describes the media item of the playlist to the wireless client computing device. Transmitting the information that describes the media item may cause the wireless client computing device to determine if the wireless client computing device is capable of outputting the media item and transmit the media item to the wireless client computing device.

Figure 5:
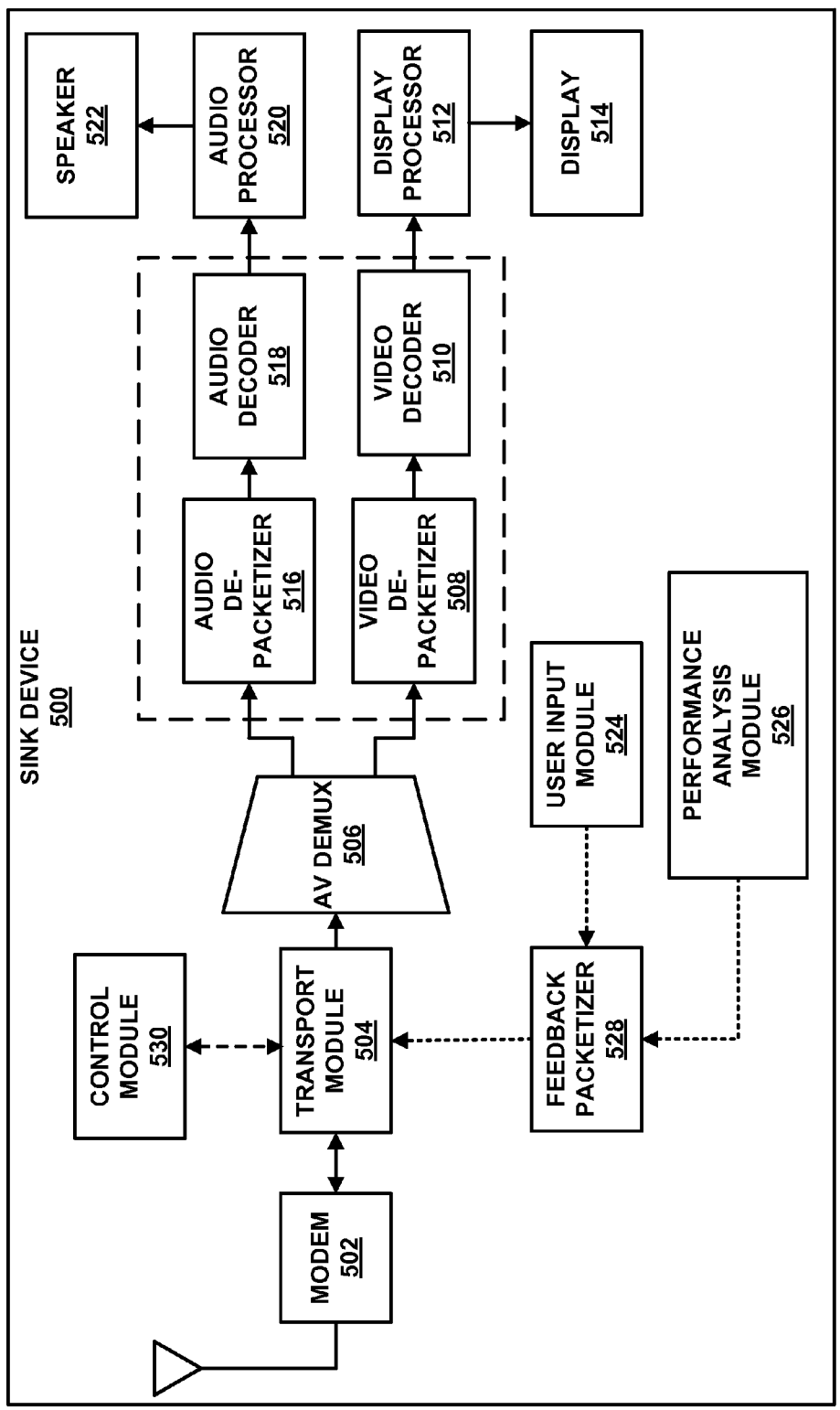
FIG. 5 is a block diagram illustrating an example of a sink device that implements techniques for receiving video and/or other information from a source device.

FIG. 5 is a block diagram illustrating an example of a sink device or client device that implements techniques for receiving video and/or other information from a source device. Sink or client device 500 may be part of a WD system that incorporates the data communication model provided in FIG. 3. In one example, Sink or client device 500 may form a WD system with source device 400. Sink or client device 500 includes modem 502, transport module 504, A/V demux 506, video de-packetizer 508, video decoder 510, display processor 512, display 514, audio depacketizer 516, audio decoder 518, audio processor 520, speaker 522, user input module 524, performance analysis module 526, feedback packetizer 528, and control module 530. The components of sink or client device 500 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Modem 502, may be configured to perform physical and MAC layer processing according to the physical and MAC layers utilized in a WD system. As described with reference to FIG. 3. Physical and MAC layers may define physical signaling, addressing and channel access control used for communications in a WD system. In one example, modem 502 may configured to perform physical layer and MAC layer processing for physical and MAC layers defined by a Wi-Fi (e.g., IEEE 802.11x) standard, such as that provided by WFD. In other examples, modem 502 may configured to perform physical layer and MAC layer processing for any of: WirelessHD, WiMedia, Wireless Home Digital Interface (WHDI), WiGig, and Wireless USB.

Transport module 504, may process received media data from a source device. Further, transport module 504 may process feedback packets for transport to a source device. For example, transport module 504 may be configured to communicate using IP, TCP, UDP, RTP, and RSTP. In addition, transport module 504 may include a timestamp value in any combination of IP, TCP, UDP, RTP, and RSTP packets. The timestamp values may enable a source device to identify which media data packet experienced a reported performance degradation and to calculate the roundtrip delay in a WD system.

A/V demux 506, may apply de-multiplexing techniques to separate video payload data and audio payload data from data stream. In one example, A/V mux 506 may separate packetized elementary video and audio streams of an MPEG2 transport stream defined according to MPEG-2 Part 1.

Video de-packetizer 508 and Video decoder 510 may perform reciprocal processing of a video packetizer and a video encoder implementing packetization and coding techniques described herein and output video output video data to display processor 512.

Display processor 512 may obtain captured video frames and may process video data for display on display 514. Display 514 may comprise one of a variety of display devices such as a liquid crystal display (LCD), a plasma display, an organic light emitting diode (OLED) display, or another type of display.

Audio de-packetizer 516 and audio decoder 518 may perform reciprocal processing of an audio packetizer and audio encoder implementing packetization and coding techniques described herein and output audio data to display processor 520

Audio processor 520 may obtain audio data from audio decoder and may process audio data for output to speakers 522. Speakers 522 may comprise any of a variety of audio output devices such as headphones, a single-speaker system, a multi-speaker system, or a surround sound system.

User input module 524 may format user input commands received by user input device such as, for example, a keyboard, mouse, trackball or track pad, touch screen, voice command recognition module, or any other such user input device. In one example user input module 524 may format user input commands according formats defined according to Human interface device commands (HIDC) 330, generic user inputs 332 and OS specific user inputs 336 described above with respect to FIG. 3.

Performance analysis module 526 may determine performance information based on media data packets received from a source device. Performance information may include: delay jitter, packet loss, error distribution in time, packet error ratio, and RSSI distribution in time, as well as other examples described herein. Performance analysis module 526 may calculate performance information according to any of the techniques described herein.

Feedback packetizer 528 may packet may process the user input information from user input module 524 and performance analysis module generator 526 to create feedback packets. In one example, a feedback packet may use the message format described with respect to FIG. 3. In addition, feedback packetizer 528 may include a timestamp value in each of the feedback packets. The timestamp values may enable a source device to identify which media data packet experienced reported performance degradation and to calculate the roundtrip delay in a WD system.

Control module 530 may be configured to perform sink or client device 500 communication control functions. Communication control functions may relate to negotiating capabilities with a source device, establishing a session with a source device, and session maintenance and management. Control module 530 may use RTSP to communication with a source device. Further, control module 530 may negotiate a capability of sink or client device 500 and a source device to support features of UIBC.

In an example, sink device 500 provides an example of a source device configured to initiate a WFD connection with a wireless source device, such as source device 400 (FIG. 4), and receive data from source device 400 via the WFD connection to source device 400. A wireless client computing device, which may be similar or identical to sink device 500 may execute a media client application that enables the wireless client device to receive a shared a media item of a playlist of source device 400. The wireless client computing device may receive information that describes the media item of the playlist from source device 400. The receipt of the information that describes the media item may cause the wireless client computing device to determine if the wireless client computing device is capable of outputting the media item. The wireless client computing device may receive the media item from source device 400.

Figure 6:
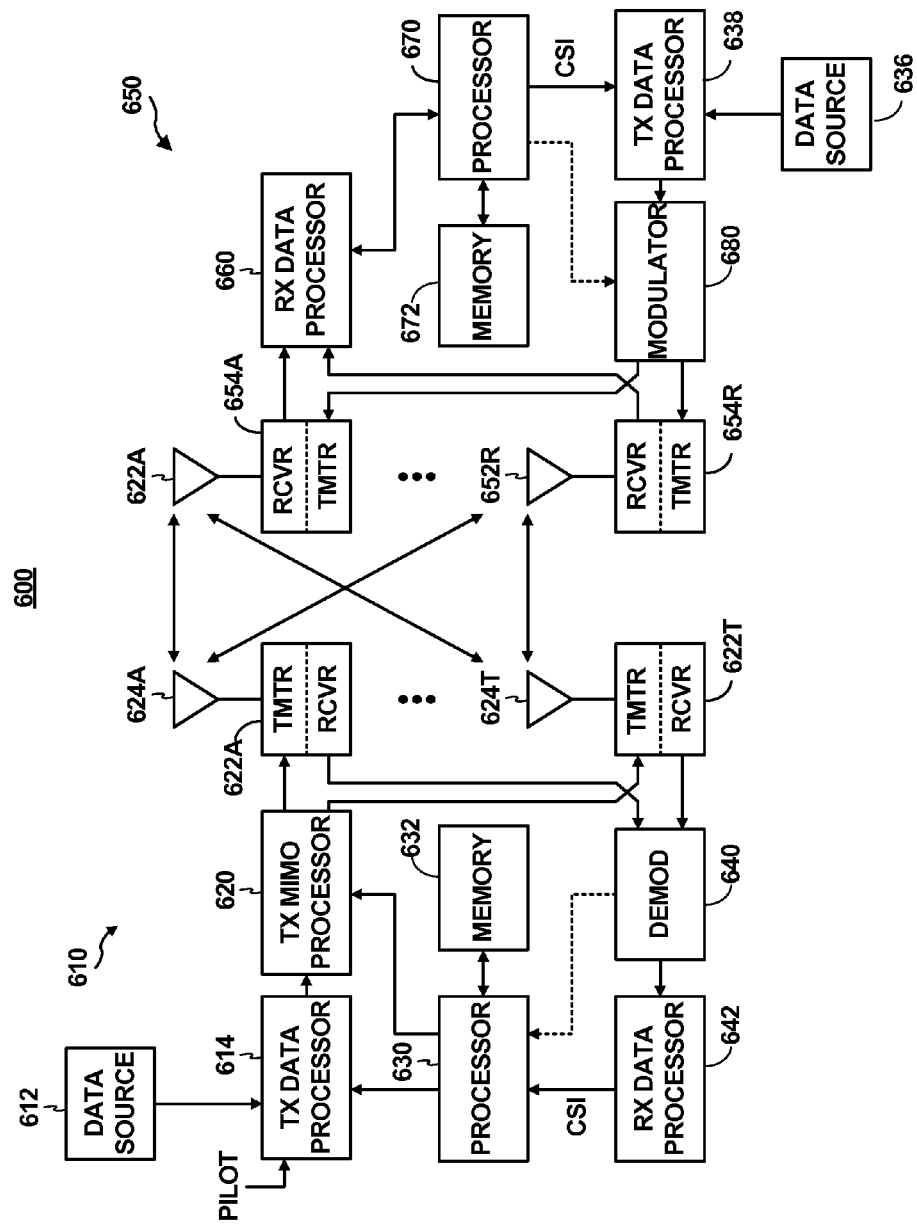
FIG. 6 is a block diagram illustrating a transmitter system and a receiver system that may implement techniques of this disclosure.

FIG. 6 shows a block diagram of an example transmitter system 610 and receiver system 650, which may be used by transmitter/receiver 126 and transmitter/receiver 166 of FIG. 1A for communicating over communication channel 150. At transmitter system 610, traffic data for a number of data streams is provided from a data source 612 to a transmit (TX) data processor 614. Each data stream may be transmitted over a respective transmit antenna. TX data processor 614 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 3 the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 630 which may be coupled with memory 632.

The modulation symbols for the data streams are then provided to a TX MIMO processor 620, which may further process the modulation symbols (e.g., for OFDM). TX MIMO processor 620 can then provide $N_T$ modulation symbol streams to $N_T$ transmitters (TMTR) 622a through 622t. In certain aspects, TX MIMO processor 620 applies beamforming weights to the symbols of the data streams and to the antenna from which the symbol is being transmitted.

Each transmitter 622 may receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 622a through 622t are then transmitted from $N_T$ antennas 624a through 624t, respectively.

At receiver system 650, the transmitted modulated signals are received by $N_R$ antennas 652a through 652r and the received signal from each antenna 652 is provided to a respective receiver (RCVR) 654a through 654r. Receiver 654 conditions (e.g., filters, amplifies, and downconverts) a respective received signal, digitizes the conditioned signal to provide samples, and further processes the samples to provide a corresponding "received" symbol stream.

A receive (RX) data processor 660 then receives and processes the $N_R$ received symbol streams from $N_R$ receivers 654 based on a particular receiver processing technique to provide $N_T$ "detected" symbol streams. The RX data processor 660 then demodulates, deinterleaves and decodes each detected symbol stream to recover the traffic data for the data stream. The processing by RX data processor 660 is complementary to that performed by TX MIMO processor 620 and TX data processor 614 at transmitter system 610.

A processor 670 that may be coupled with a memory 672 periodically determines which pre-coding matrix to use. The reverse link message may comprise various types of information regarding the communication link and/or the received data stream. The reverse link message is then processed by a TX data processor 638, which also receives traffic data for a number of data streams from a data source 636, modulated by a modulator 680, conditioned by transmitters 654a through 654r, and transmitted back to transmitter system 610.

At transmitter system 610, the modulated signals from receiver system 650 are received by antennas 624, conditioned by receivers 622, demodulated by a demodulator 640, and processed by a RX data processor 642 to extract the reserve link message transmitted by the receiver system 650. Processor 630 then determines which pre-coding matrix to use for determining the beamforming weights then processes the extracted message.

Figure 7A:
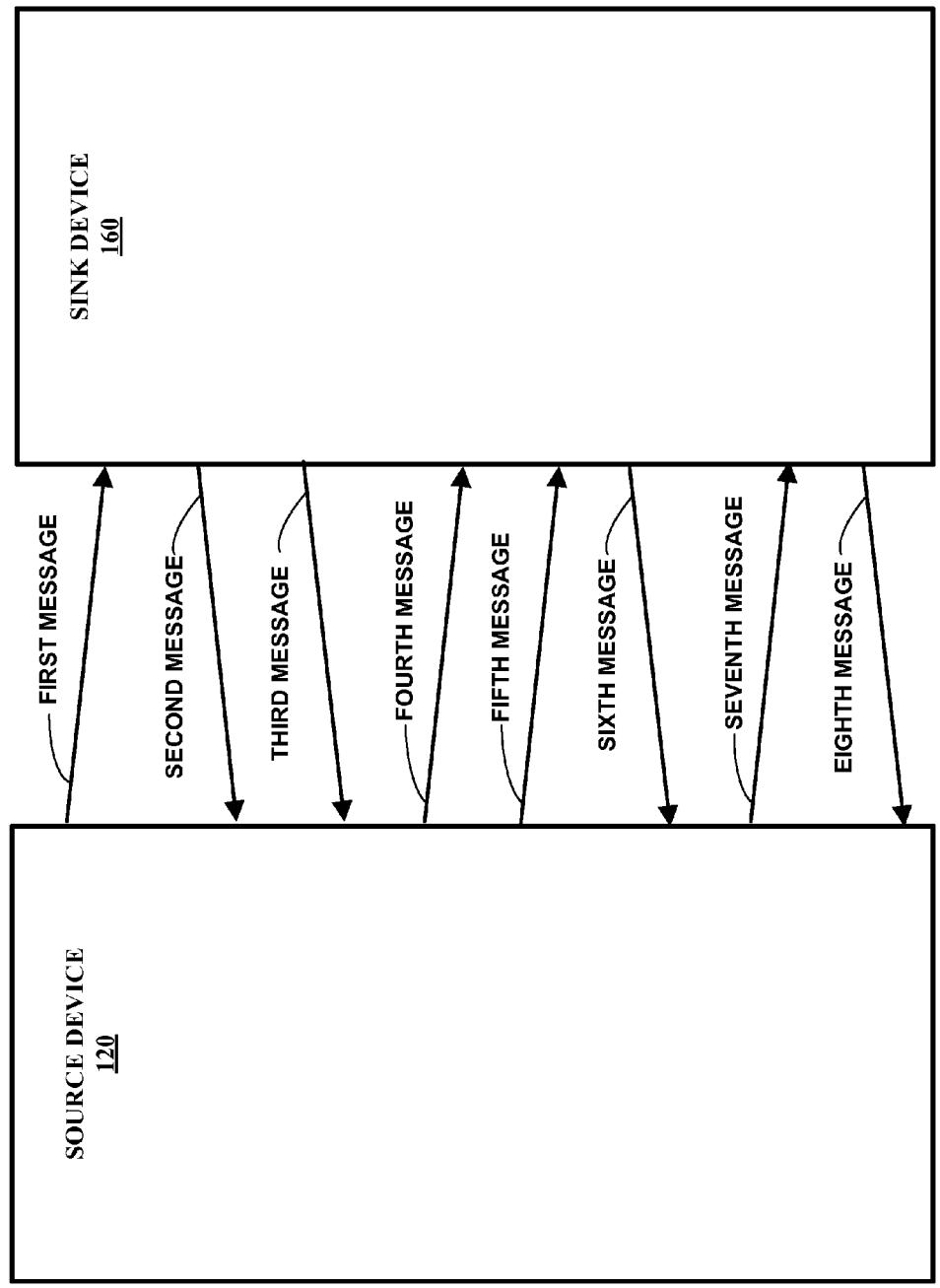
FIGS. 7A and 7B show example message transfer sequences for performing WI-FI Display (WFD) capability negotiations.

FIG. 7A is a block diagram illustrating an example message transfer sequence between a source device 120 and a sink device 160 as part of a capabilities negotiation for a WFD session. Capability negotiation may occur as part of a larger WFD communication session establishment process between source device 120 and sink device 160. This session may, for example, be established with WI-FI Direct or TDLS as the underlying connectivity standard. After establishing the WI-FI Direct or TDLS session, sink device 160 can initiate a TCP connection with source device 120. As part of establishing the TCP connection, a control port running a real time streaming protocol (RTSP) can be established to manage a communication session between source device 120 and sink device 160.

Source device 120 may generally operate in the same manner described above for source device 120 of FIG. 1A, and sink device 160 may generally operate in the same manner described above for sink device 160 of FIG. 1A. After source device 120 and sink device 160 establish connectivity, source device 120 and sink device 160 may determine the set of parameters to be used for their subsequent communication session as part of a capability negotiation exchange.

Source device 120 and sink device 160 may negotiate capabilities through a sequence of messages. The messages may, for example, be real time streaming protocol (RTSP) messages. At any stage of the negotiations, the recipient of an RTSP request message may respond with an RTSP response that includes an RTSP status code other than RTSP OK, in which case, the message exchange might be retried with a different set of parameters or the capability negotiation session may be ended.

Source device 120 can send a first message (RTSP OPTIONS request message) to sink device 160 in order to determine the set of RTSP methods that sink device 160 supports. On receipt of the first message from source device 120, sink device 160 can respond with a second message (RTSP OPTIONS response message) that lists the RTSP methods supported by sink 160. The second message may also include a RTSP OK status code.

After sending the second message to source device 120, sink device 160 can send a third message (RTSP OPTIONS request message) in order to determine the set of RTSP methods that source device 120 supports. On receipt of the third message from sink device 160, source device 120 can respond with a fourth message (RTSP OPTIONS response message) that lists the RTSP methods supported by source device 120. The fourth message can also include RTSP OK status code.

After sending the fourth message, source device 120 can send a fifth message (RTSP GET_PARAMETER request message) to specify a list of capabilities that are of interest to source device 120. Sink device 160 can respond with a sixth message (an RTSP GET_PARAMETER response message). The sixth message may contain an RTSP status code. If the RTSP status code is OK, then the sixth message can also include response parameters to the parameter specified in the fifth message that are supported by sink device 160. Sink device 160 can ignore parameters in the fifth message that sink device 160 does not support.

Based on the sixth message, source 120 can determine the optimal set of parameters to be used for the communication session and can send a seventh message (an RTSP SET_PARAMETER request message) to sink device 160. The seventh message can contain the parameter set to be used during the communication session between source device 120 and sink device 160. The seventh message can include the wfd-presentation-url that describes the Universal Resource Identifier (URI) to be used in the RTSP Setup request in order to setup the communication session. The wfd-presentation-url specifies the URI that sink device 160 can use for later messages during a session establishment exchange. The wfd-url0 and wfd-url1 values specified in this parameter can correspond to the values of rtp-port0 and rtp-port1 values in the wfd-client-rtp-ports in the seventh message. RTP in this instance generally refers to the real-time protocol which can run on top of the UDP.

Upon receipt of the seventh message, sink device 160 can respond with an eighth message with an RTSP status code indicating if setting the parameters as specified in the seventh message was successful. As mentioned above, the roles or source device and sink device may reverse or change in different sessions. The order of the messages that set up the communication session may, in some cases, define the device that operates as the source and define the device that operates as the sink.

Figure 7B:
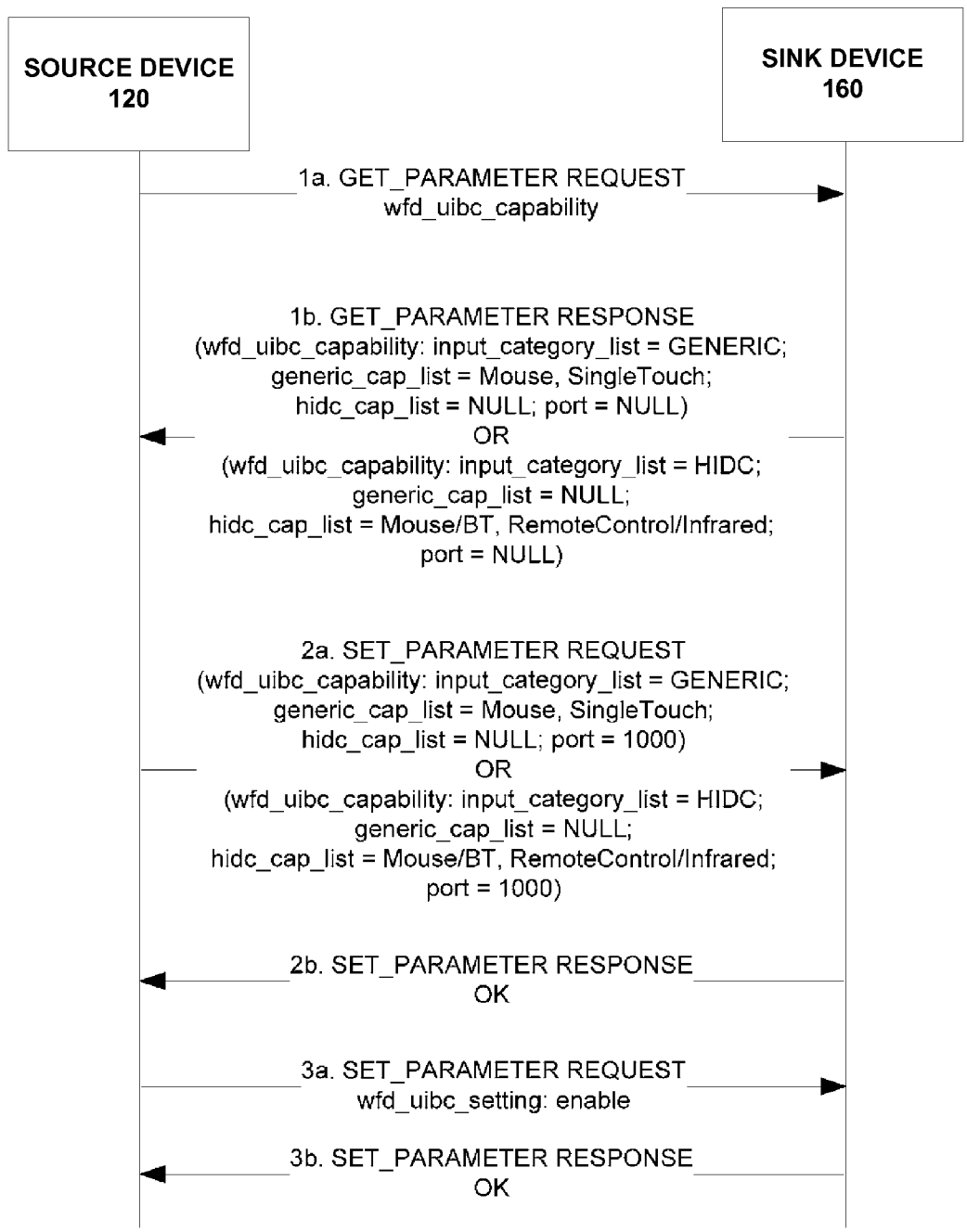

FIG. 7B is a block diagram illustrating another example message transfer sequence between a source device 120 and a sink device 160 as part of capabilities negotiations session. The message transfer sequence of FIG. 7B is intended provide a more detailed view of the transfer sequence described above for FIG. 7A. In FIG. 7B, message "1b. GET_PARAMETER RESPONSE" shows an example of a message that identifies a list of supported input categories (e.g. generic and HIDC) and a plurality of lists of supported input types. Each of the supported input categories of the list of supported input categories has an associated list of supported types (e.g. generic_cap_list and hidc_cap_list). In FIG. 7B, message "2a. SET_PARAMETER REQUEST" is an example of a second message that identifies a second list of supported input categories (e.g. generic and HIDC), and a plurality of second lists of supported types. Each of the supported input categories of the second list of supported input categories has an associated second list of supported types (e.g. generic_cap_list and hidc_cap_list). Message "1b. GET_PARAMETER RESPONSE" identifies the input categories and input types supported by sink device 160. Message "2a. SET_PARAMETER REQUEST" identifies input categories and input types supported by source device 120, but it may not be a comprehensive list of all input categories and input types supported by source device 120. Instead, message "2a. SET_PARAMETER REQUEST" may identify only those input categories and input types identified in message "1b. GET_PARAMETER RESPONSE" as being supported by sink device 160. In this manner, the input categories and input types identified in message "2a. SET_PARAMETER REQUEST" may constitute a subset of the input categories and input types identified in message "1b. GET_PARAMETER RESPONSE."

Figure 8:
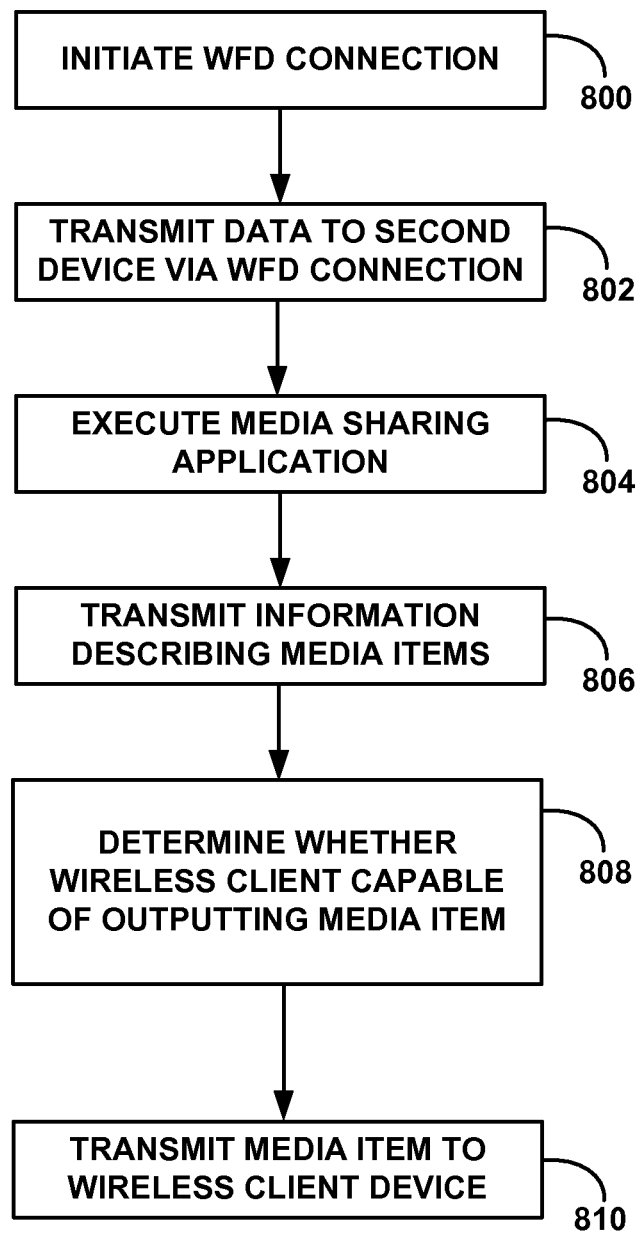
FIG. 8 is a flowchart illustrating a method of performing WFD and transmitting media items in accordance with the techniques of this disclosure.

FIG. 8 is a flowchart illustrating a method of performing WFD and transmitting media items in accordance with the techniques of this disclosure. The method of FIG. 8 may be performed by a device, such as source device 120 of FIG. 1A and FIG. 1B, as an example. Although FIG. 8 will be explained with reference to source device 120, other source devices, including source device 400 of FIG. 4, may also perform the techniques of FIG. 8. In the method of FIG. 8, source device 120 may initiate a WFD connection to sink device 160 (FIG. 1A) (800). In some examples, sink device 160 and client device 180 may be the same device.

Source device 120 may initiate a WI-FI display (WFD) connection to sink device 160 (800). Source device 120 may also transmit data from source device 120 via the WFD connection to sink device 160 (FIG. 1A) (802). In an example, transmitting the data from source device 120 to sink device 160 may cause sink device 160 to mirror a display output device of source device 120. Source device 120 may also receive user input from sink device 160.

Source device 120 may execute a media sharing application that enables source device 120 to share a media item of a playlist with client device 180 (FIG. 1B) (804). Source device 120 may transmit information that describes the media item, and which describes the format of the media item of the playlist to client device 180 (806). In some examples, the information describing the media item comprises at least one of extensible markup language (XML), binary, hypertext markup language (HTML), and comma separated values (CSV). The information describing the media item may include at least one of bit rate, level, resolution, file type, and file name of the media item.

Source device 120 may also transmit WFD data related to at least one of the playlist and the media item of the playlist via a second WFD connection to wireless client device 180. Source device 120 may further receive a user input back channel input command from client device 180 via the second WFD connection. In response to receiving the UIBC input command, the first wireless computing device may terminate the second WFD connection.

Transmitting the information that describes the media item of the playlist may cause client device 180 to determine whether client device 180 is capable of outputting the media item (808). Source device 120 may transmit the media item to client device 180 (810). Source device 120 may also receive a media playback command from client device 180, which may comprise a RTSP directive in some examples. In some instances, source device 120 may transmit the media item using RTP. In some instances, transmitting the media item with source device 120 may occur after receiving the media playback command from client device 180.

Source device 120 may also receive authentication information from client device 180. Source device 120 may authenticate the wireless client device based on the authentication information, and grant access client device 180 access to the playlist in response to authenticating client device 180.

Although illustrated in a particular order for the purposes of example, the method of FIG. 8 may be performed in any order or in parallel, and the method of FIG. 8 may further comprise transmitting data with the WFD connection and executing the media sharing application simultaneously.

In one or more examples, the functions described in this disclosure may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transmitting content of a first wireless computing device to a second wireless computing device, the method comprising:
    initiating, with the first wireless computing device, a WI-FI display (WFD) connection with the second wireless computing device;
    transmitting, with the first wireless computing device, data from the first wireless computing device via the WFD connection to the second wireless computing device;
    establishing a wireless communication channel between the first wireless computing device and a wireless client computing device;
    executing, with the first wireless computing device, a media sharing application that enables the first wireless computing device to share a media item of a playlist with the wireless client computing device across the wireless communication channel;
    transmitting, with the first wireless computing device and via the wireless communication channel, information that describes the media item of the playlist to the wireless client computing device, wherein the information that describes the media item includes at least one of: a bit rate, level, resolution, file type, or file name of the media item and wherein transmitting the information that describes the media item causes the wireless client computing device to determine if the wireless client computing device is capable of outputting the media item; and
    transmitting, with the first wireless computing device and via the wireless communication channel, the media item to the wireless client computing device.

2. The method of claim 1, wherein transmitting the data from the first wireless computing device to the second wireless computing device causes the second wireless computing device to mirror a display output device of the first wireless computing device.

3. The method of claim 1, wherein the information that describes the format of the media item comprises at least one of extensible markup language (XML), binary, hypertext markup language (HTML), and comma separated values (CSV).

4. The method of claim 1, further comprising receiving a media playback command from the wireless client computing device.

5. The method of claim 4, wherein the media playback command comprises a Real-Time Streaming Protocol (RTSP) directive.

6. The method of claim 4, wherein transmitting the media item occurs in response to receiving the media playback command from the wireless client computing device.

7. The method of claim 1, further comprising receiving, with the first wireless computing device, user input from the second wireless computing device.

8. The method of claim 1, wherein the data transmission via the WFD connection and the execution of the media sharing application occur simultaneously.

9. The method of claim 1, further comprising:
receiving, with the first wireless computing device and via the wireless communication channel, authentication information from the wireless client computing device;
authenticating, with the first wireless computing device, the wireless client computing device based on the authentication information; and
granting, with the first wireless computing device, access to the playlist to the wireless client computing device in response to authenticating the wireless client computing device.

10. The method of claim 1, wherein transmitting the media item comprises streaming the media item using Real-Time Transport Protocol (RTP).

11. The method of claim 1, wherein the second wireless computing device and the wireless client computing device are different devices, wherein the WFD connection comprises a first WFD connection, the method further comprising:
transmitting, with the first wireless computing device, the media item to the second wireless computing device;
receiving, with the first wireless computing device and from the second wireless computing device, user input related to the media item;
transmitting, with the first wireless computing device, WFD data related to at least one of the playlist and the media item of the playlist via a second WFD connection to the wireless client computing device; and
receiving, with the first wireless computing device, a user input back channel (UIBC) input command from the wireless client computing device via the second WFD connection.

12. The method of claim 11, further comprising:
terminating, with the first wireless computing device, the second WFD connection in response to receiving the UIBC input command from the wireless client computing device.

13. The method of claim 1, wherein executing the media sharing application that enables the first wireless computing device to share the media item of the playlist with the wireless client computing device further comprises:
transmitting, with the first wireless computing device, the playlist to the wireless client computing device.

14. The method of claim 1, wherein the second wireless computing device and the wireless client computing device are the same device.

15. A first wireless computing device comprising:
a WI-FI display (WFD) module configured to:
initiate a WI-FI display (WFD) connection with a second wireless computing device; and
transmit data from the first wireless computing device via the WFD connection to the second wireless computing device; and
a media sharing module configured to:
execute a media sharing application that enables the first wireless computing device to share a media item of a playlist with a wireless client computing device across a wireless communication channel;
transmit information that describes the media item of the playlist to the wireless client computing device via the wireless communication channel,
wherein the information that describes the media item includes at least one of: a bit rate, level, resolution, file type, or file name of the media item, and
wherein the transmission of the information that describes the media item causes the wireless client computing device to determine if the wireless client computing device is capable of outputting the media item and to transmit the media item to the wireless client computing device via the wireless communication channel.

16. The first wireless computing device of claim 15, wherein the transmission of the data from the first wireless computing device to the second wireless computing device causes the second wireless computing device to mirror a display output device of the first wireless computing device.

17. The first wireless computing device of claim 15, wherein the information that describes the format of the media item comprises at least one of extensible markup language (XML), binary, hypertext markup language (HTML), and comma separated values (CSV).

18. The first wireless computing device of claim 15, wherein the media sharing module is further configured to receive a media playback command from the wireless client computing device.

19. The first wireless computing device of claim 18, wherein the media playback command comprises a Real-Time Streaming Protocol (RTSP) directive.

20. The first wireless computing device of claim 18, wherein the media sharing module is configured to transmit the media item in response to receiving the media playback command from the wireless client computing device.

21. The first wireless computing device of claim 15, wherein the WFD module is further configured to receive user input from the second wireless computing device.

22. The first wireless computing device of claim 15, wherein the data transmitted via the WFD connection and the execution of the media sharing application occur simultaneously.

23. The first wireless computing device of claim 15, wherein the media sharing module is further configured to:
receive authentication information from the wireless client computing device via the wireless communication channel;
authenticate the wireless client computing device based on the authentication information; and
grant the wireless client computing device access to the playlist in response to the authentication of the wireless client computing device.

24. The first wireless computing device of claim 15, wherein to transmit the media item, the WFD module is configured to stream the media item using Real-Time Transport Protocol (RTP).

25. The first wireless computing device of claim 15, wherein the second wireless computing device and the wireless client computing device are different devices, wherein the WFD connection comprises a first WFD connection, wherein the WFD module is further configured to:
transmit, with the first wireless computing device, the media item to the second wireless computing device;
receive, with the first wireless computing device, user input related to the media item from the second wireless computing device;
transmit WFD data related to at least one of the playlist and the media item of the playlist via a second WFD connection to the wireless client computing device; and
receive a user input back channel (UIBC) input command from the wireless client computing device via the second WFD connection.

26. The first wireless computing device of claim 25, wherein the WFD module is further configured to:
terminate the second WFD connection in response to receiving the UIBC input command from the wireless client computing device.

27. The first wireless computing device of claim 15, wherein to execute the media sharing application that enables the first wireless computing device to share the media item of the playlist with the wireless client computing device, the media sharing module is further configured to:
 transmit the playlist to the wireless client computing device.

28. The first wireless computing device of claim 15, wherein the second wireless computing device and the wireless client computing device are the same device.

29. A first wireless computing device comprising:
 means for initiating a WI-FI display (WFD) connection with a second wireless computing device;
 means for transmitting data via the WFD connection to the second wireless computing device;
 means for establishing a wireless communication channel with a wireless client computing device;
 means for executing a media sharing application that enables the first wireless computing device to share a media item of a playlist with the wireless client computing device across the communication channel;
 means for transmitting, via the wireless communication channel, information that describes the media item of the playlist to the wireless client computing device, wherein the information that describes the media item includes at least one of: a bit rate, level, resolution, file type, or file name of the media item, wherein the information causes the wireless client computing device to determine if the wireless client computing device is capable of outputting the media item; and
 means for transmitting the media item via the wireless communication channel to the wireless client computing device.

30. A non-transitory, computer-readable storage medium including instructions stored thereon that when executed cause one or more processors to:
 initiate a WI-FI display (WFD) connection with a second wireless computing device;
 transmit data from the first wireless computing device via the WFD connection to the second wireless computing device;
 establish a wireless communication channel between the first wireless computing device and a wireless client computing device;
 execute a media sharing application that enables the first wireless computing device to share a media item of a playlist with the wireless client computing device across the wireless communication channel;
 transmit information that describes the format of the media item of the playlist to the wireless client computing device via the wireless communication channel, wherein the information that describes the media item includes at least one of: a bit rate, level, resolution, file type, or file name of the media item, wherein the information, when received by the wireless client computing device, causes the wireless client computing device to determine if the wireless client computing device is capable of outputting the media item; and
 transmit the media item to the wireless client computing device via the wireless communication channel.

\* \* \* \* \*